(12) United States Patent
Binder

(10) Patent No.: US 9,007,961 B2
(45) Date of Patent: Apr. 14, 2015

(54) APPARATUS AND METHOD FOR USING AND SOLVING LINEAR PROGRAMMING PROBLEM AND APPLICATIONS THEREOF

(75) Inventor: Yehuda Binder, Hod Hasharon (IL)

(73) Assignee: May Patents Ltd., Hod-Hasharon (IL)

( * ) Notice: Subject to any disclaimer, the term of this patent is extended or adjusted under 35 U.S.C. 154(b) by 318 days.

(21) Appl. No.: 13/300,928

(22) Filed: Nov. 21, 2011

(65) Prior Publication Data
US 2012/0127893 A1    May 24, 2012

Related U.S. Application Data

(60) Provisional application No. 61/416,264, filed on Nov. 22, 2010.

(51) Int. Cl.
*H04L 12/28* (2006.01)
*H04L 12/933* (2013.01)

(52) U.S. Cl.
CPC ................. *H04L 49/101* (2013.01)

(58) Field of Classification Search
CPC ....... G06G 7/122; G06Q 10/04; G06Q 10/06; G05B 13/048; G05B 17/02; H04L 49/101
See application file for complete search history.

(56) References Cited

U.S. PATENT DOCUMENTS

| | | |
|---|---|---|
| 4,744,026 A | 5/1988 | Vanderbei |
| 4,744,027 A | 5/1988 | Bayer et al. |
| 4,744,028 A | 5/1988 | Karmarkar |
| 4,885,686 A | 12/1989 | Vanderbei |
| 4,914,563 A | 4/1990 | Karmarkar et al. |
| 4,924,386 A | 5/1990 | Freedman et al. |
| 5,136,538 A | 8/1992 | Karmarkar et al. |
| 5,319,712 A | 6/1994 | Finkelstein et al. |
| 5,357,571 A | 10/1994 | Banwart |
| 5,471,408 A | 11/1995 | Takamoto et al. |
| 5,835,710 A | 11/1998 | Nagami et al. |
| 5,864,552 A | 1/1999 | Du et al. |

(Continued)

FOREIGN PATENT DOCUMENTS

| | | |
|---|---|---|
| EP | 0948176 | 11/2006 |
| WO | 0018078 | 3/2000 |
| WO | 2013006233 A1 | 1/2013 |

OTHER PUBLICATIONS

Motwani R et al: "Chapter 9: Geometric algorithms and linear programming" In: "Randomized Algorithms", 1995, Cambridge University Press, XP55042519, pp. 234-277 & Sections 9.4 and 9.10.

(Continued)

*Primary Examiner* — Yong Zhou
(74) *Attorney, Agent, or Firm* — Browdy and Neimark, PLLC

(57) ABSTRACT

Method and system for analyzing a linear programming problem or any other problem involving inequalities constraints set relating to multiple variables. An initial feasible region is calculated based on a sub-set of the constraints set. The feasible region is updated based on the additional constraints added one at a time. The method checks for feasibly, identifies active constraints, and provides end-points of the feasible region. The method may be applied to a control system or to a crossbar switch handling routing between multiple input and multiple outputs, such as digital data networking switch used to route TDM digital data streams being packet, frame or cell based, in a LAN, WAN, MAN or Internet application.

35 Claims, 31 Drawing Sheets

(56) References Cited

U.S. PATENT DOCUMENTS

| | | | |
|---|---|---|---|
| 6,016,305 A * | 1/2000 | Borst et al. | 370/234 |
| 6,069,894 A | 5/2000 | Holender et al. | |
| 6,072,772 A | 6/2000 | Charny et al. | |
| 6,122,743 A | 9/2000 | Shaffer et al. | |
| 6,401,189 B1 | 6/2002 | Corinthios | |
| 6,516,313 B1 | 2/2003 | Perry | |
| 6,704,312 B1 | 3/2004 | Chang et al. | |
| 7,164,667 B2 | 1/2007 | Rayment et al. | |
| 7,171,493 B2 | 1/2007 | Shu et al. | |
| 7,274,658 B2 | 9/2007 | Bornstein et al. | |
| 7,359,384 B2 | 4/2008 | Kodialam et al. | |
| 7,489,638 B2 | 2/2009 | Keslassy et al. | |
| 7,590,245 B1 | 9/2009 | Levitan | |
| 7,596,534 B2 | 9/2009 | Musuvathi et al. | |
| 7,656,886 B2 | 2/2010 | Lea et al. | |
| 7,672,862 B1 | 3/2010 | Venkatasubramanyan et al. | |
| 7,689,592 B2 | 3/2010 | Denton et al. | |
| 7,689,940 B2 | 3/2010 | New et al. | |
| 7,710,869 B1 | 5/2010 | Gleichauf et al. | |
| 7,725,674 B2 | 5/2010 | Thorsen | |
| 7,788,624 B1 | 8/2010 | Das et al. | |
| 7,877,597 B2 | 1/2011 | Hariharan et al. | |
| 7,929,429 B2 | 4/2011 | Bornstein et al. | |
| 7,983,194 B1 | 7/2011 | Genetti et al. | |
| 8,010,924 B1 | 8/2011 | Slonim et al. | |
| 8,082,549 B2 | 12/2011 | Corley, Jr. et al. | |
| 8,171,101 B2 | 5/2012 | Gladwin et al. | |
| 8,180,658 B2 | 5/2012 | Hamadi et al. | |
| 8,255,259 B2 | 8/2012 | Connors et al. | |
| 8,307,263 B2 | 11/2012 | Grube et al. | |
| 8,351,600 B2 | 1/2013 | Resch | |
| 8,380,960 B2 | 2/2013 | Jia et al. | |
| 8,463,729 B2 | 6/2013 | Achterberg | |
| 8,494,994 B2 | 7/2013 | Hazan et al. | |
| 8,601,486 B2 | 12/2013 | Achterberg et al. | |
| 8,601,487 B2 | 12/2013 | Achterberg et al. | |
| 2003/0058848 A1 | 3/2003 | Dally | |
| 2003/0115364 A1 | 6/2003 | Shu et al. | |
| 2003/0227901 A1 | 12/2003 | Kodialam et al. | |
| 2004/0252628 A1 | 12/2004 | Detzler | |
| 2005/0141804 A1 | 6/2005 | Yang et al. | |
| 2005/0171826 A1 | 8/2005 | Denton et al. | |
| 2006/0089988 A1 * | 4/2006 | Davie et al. | 709/225 |
| 2006/0156169 A1 | 7/2006 | Shen et al. | |
| 2006/0165070 A1 | 7/2006 | Hall et al. | |
| 2006/0171316 A1 | 8/2006 | El-Sakkout et al. | |
| 2006/0242647 A1 | 10/2006 | Kimbrel et al. | |
| 2007/0140271 A1 * | 6/2007 | Amante et al. | 370/401 |
| 2007/0153702 A1 | 7/2007 | Khan Alicherry et al. | |
| 2007/0237081 A1 | 10/2007 | Kodialam et al. | |
| 2007/0280261 A1 | 12/2007 | Szymanski | |
| 2008/0015259 A1 | 1/2008 | Niddam-Hildesheim | |
| 2008/0134193 A1 * | 6/2008 | Corley et al. | 718/104 |
| 2008/0189418 A1 | 8/2008 | Kimbrel et al. | |
| 2008/0247407 A1 | 10/2008 | Westphal et al. | |
| 2009/0192769 A1 | 7/2009 | Dangui et al. | |
| 2009/0271230 A1 | 10/2009 | Huang et al. | |
| 2010/0268677 A1 | 10/2010 | Bhatnagar | |
| 2011/0057652 A1 | 3/2011 | Hoecht et al. | |
| 2011/0131167 A1 | 6/2011 | Achterberg | |
| 2011/0222506 A1 * | 9/2011 | Szymanksi | 370/330 |
| 2011/0276872 A1 | 11/2011 | Kataria et al. | |
| 2012/0033662 A1 | 2/2012 | Szymanski | |
| 2012/0127893 A1 | 5/2012 | Binder | |
| 2012/0236849 A9 | 9/2012 | Szymanski | |
| 2012/0311604 A1 | 12/2012 | Achterberg et al. | |
| 2012/0311607 A1 | 12/2012 | Achterberg et al. | |
| 2013/0117062 A1 | 5/2013 | Rangarajan et al. | |
| 2013/0145121 A1 | 6/2013 | Fawcett | |
| 2013/0145203 A1 | 6/2013 | Fawcett | |
| 2013/0223324 A1 | 8/2013 | Somasundaram et al. | |

OTHER PUBLICATIONS

Horst R et al: "On finding new vertices and redundant constraints in cutting plane algorithms for global optimization", Operations Research Letters, vol. 7, No. 2, Apr. 1988, pp. 85-90 XP007921204.

Matheiss T H et al: "A survey and comparison of methods for finding all vertices of convex polyhedral sets", Mathematics of Operational Research, vol. 5, No. 2, May 1980, pp. 167-185, XP55042567.

Burke D J et al: "Optimal firm wind capacity allocation to power systems with security constraints", 2009 IEEE PES power systems conference and exposition 2009 (PSCE '09), Mar. 15-18, 2009, Mar. 15, 2009, pp. 1-9, XP031450693.

Paulraj S et al: "A comparative study of redundant constraints Identification methods in linear programming problems", Mathematical Problems in Engineering, Article ID 723402, vol. 2010, 2010, pp. 1-16, XP55042558.

Keslassy I et al.: "On guaranteed smooth scheduling for input-queued switches", IEEE/ACM Transactions on Networking, vol. 13, No. 6, Dec. 2005, pp. 1364-1375 XP001512900.

Partial International Search of PCT Application No. PCT/IL2011/000859 dated Nov. 7, 2012.

C S Chang W.J. Chen, H.Y Huang, "On Service Guarantees for Input Buffered Crossbar Switches: A capacity Decomposition approach by Birkhoff and von Neumann", Proc. IWQoS Conf., 1999, pp. 79-86, IEEE, USA (8 pages).

I. Keslassy, M. Kodialam, T.V Lakshman, D. Stiliadis, "On Guaranteed Smooth Scheduling for Input-Queued Switches", IEEE/ACM Trans. Networking, Dec. 2003, pp. 1364-1375, vol. 13, No. 6, IEEE, USA (11 pages).

Z. Liu, X. Zhang, Y. Zhao, R. Wang, "A performance Analysis Framework for Routing Lookup in Scalable Routers", Proceedings of the 23rd international conference on Information Networking, Chiang Mai, Thailand, pp. 225-229, 2009, ISBN: 978-4244-4526-4 (5 pages).

S. Mohanty, L.N. Bhuyan, "Guaranteed Smooth Switch Scheduling with Low Complexity", Proc. Globecom Conf. 2005, pp. 626-630, IEEE, USA (5 pages).

J. Li, N. Ansari, "Enhanced Birkhoff-von Newmann decomposition algorithm for input queued switches", IEE Proc. Commun., vol. 148, No. 6, Dec. 2001, pp. 339-342 (4 pages).

C.S. Chang, W.J. Chen, H.Y.Huang, "Birkhoff-von Neumann Input Buffered Crossbar Switches", Proc. Infocom Conf. 2000, pp. 1614-1623, IEEE, USA (10 pages).

J.D. Carpinelli, Y. Oruc, "A Non-backtracking Matrix Decomposition Algorithm for Routing on Clos Networks", IEEE Trans. Commun. Aug. 1993, pp. 1245-1251, vol. 41, No. 8, IEEE USA (17 pages).

T.H. Szymanski, "A Low-Jitter Guaranteed-Rate Scheduling Algorithm for Packet-based IP Routers", IEEE Trans. on Communication, vol. 57, No. 11, Nov. 2009, pp. 3445-3459, IEEE USA (14 pages).

C. Wang, K. Ren, J. Wang, the department of Electrical and Computer Engineering Illinois Institute of Technology, "Secure and Practical Outsourcing of Linear Programming in Cloud Computing", downloaded from the Internet Oct. 2011 (9 pages).

V. Anantharam, N. McKeown, J. Walrand, "Achieving 100% Throughput in an Input-Queued Switch", IEEE Trans. Communication, Aug. 1999, p. 1260-1267, vol. 47, No. 8, USA (7 pages).

T. Weller, B. Hajek, "Scheduling Nonuniform Traffic in a Packet-Switching System with Small Propagation Delay", IEEE/ACM Trans. on Networking, Dec. 1997, pp. 813-823, vol. 5 No. 6, IEEE USA (11 pages).

A. Hung, G. Kesidis, N. McKeown, "ATM Input-Buffered Switches with the Guaranteed Rate Property", Proc. Symp. Comput. and Commun. (ISCC) Conf., 1998, pp. 331-335, IEEE USA (5 pages).

C. E. Koksal. R. G. Gallager, C. E. Rohrs, "Rate Quantization and Service Quality over Single Crossbar Switches", Infocom Conf., 2004, pp. 1962-1973, IEEE USA (12 pages).

J.S. Turner, R. Melen, "Multirate Clos Networks", IEEE Comm Mag., Oct. 2003 (11 pages).

Bradely, Hax, and Magnanti Book, MIT, "Integer Programming" Chapter 9, Addison-Wesley, 1977, pp. 272-319 (48 pages).

(56) References Cited

OTHER PUBLICATIONS

S. Sen, J. L. Higle, The University of Arizona, "An Introductory Tutorial on Stochastic Linear Programming Models", INTERFACES 29: Mar. 2-Apr. 1999, pp. 33-61 (29 pages).
Arsham, H., "A Computationally stable solution algorithm for linear programs," Applied Mathematics and Computation, 188:1549-1561,(2007).
Bixby, R. E., "Solving real-world linear programs: a decade and more of progress," Operations Research 50:3-15 (2002).
Gill, P. E., et al., "A numerically stable form of the simplex algorithm," Linear Algebra and Its Applications (1973) 7:99-138.
Corley, H. W., et al., "The cosine simplex algorithm," International Journal of Advanced Manufacturing Technology (2006) 27:1047-1050.
Dare. P., et al., "GPS network design: logistics solution using optimal and near-optimal methods," Journal of Geodesy (2000) 74:467-478.
Johnson, E. L., et al., "Progress in linear programming-based algorithms for integer programming: an exposition," INFORMS Journal of Computing (2000) 12:2-23.
Karmarkar, M., "A new polynomial-time algorithm for linear programming," Combinatorica (1984) 4:373-379.
Li, H. L., et al., "A linear programming approach for identifying a consensus sequence on DNA sequences," Bioinformatics (2005) 21:1838-1845.
Li, W., "A Basis-Deficiency-Allowing Primal Phase-I Algorithm using the Most-Obtuse-Angle Column Rule," Computers and Mathematics with Applications (2006), 51:903-914.
Santos-Palomo, A., "The sagitta method for solving linear programs," European Journal of Operational Researxh (2004), 157:527-539.
Santos-Palomo, A., et al., "A non-simplex active-set method for linear programs in standard form," Studies in Informatics and Control (2005) 14:79-84.
Todd, M. J., "The many facets of linear programming," Mathematical Programming (2002) 91:417-436.
Vieira, H., et al., "An improved initial basis for the simplex algorithm," Computers and Operations Research (2005) 32:1983-1993.
G. B. Dantzig "Maximization of a linear function of variables subject to linear inequalities," in Activity Analysis of Production and Allocation, T. C. Koopmans (ed.), 1951, 339-347.

P.-Q. Pan, "A basis-deficiency-allowing variation of the simplex method of linear programming," Computers and Mathematics with Applications 36 (1998) 33-53.
Akyildiz and Wang, "A survey on wireless mesh networks," IEEE Radio Communications, Sep. 2005, pp. S23-S30.
Chrysos and Katevenis, "Weighted fairness in buffered crossbar scheduling." IEEE, Proc. of the Workshop on High Performance Switching and Routing (HPSR-2003), Torino, Italy, Jun. 2003, pp. 17-22.
Genc et al.,"IEEE 802.16j relay-based wireless access networks: an overview," IEEE Wireless Communications, Oct. 2008, pp. 56-63.
IEEE Standard for Information technology—Telecommunications and information exchange between systems—Local and metropolitan area networks—Specific requirements, Part 11: Wireless LAN Medium Access Control (MAC) and Physical Layer (PHY) Specification, IEEE Std 802.11-2007.
Jain et al., "Impact of interference on multi-hop wireless network performance," ACM Mobicom, 2003, pp. 1-22.
Prabhakar and McKeown, "On the speedup required for combined input- and output-queued switching," Automatica, 1999, vol. 35, pp. 1909-1920.
Szymanski, "A Low-jitter guaranteed-rate scheduling algorithm for packet-switched IP routers," IEEE Transactions on Communications, Nov. 2009, vol. 57, No. 11, pp. 3446-3459.
Szymanski, "Bounds on end-to-end delay and jitter in input-buffered and internally-buffered IP networks," to appear in the IEEE Transactions on Communications, Nov. 2009, pp. 1-6.
Tassiulas and Ephremides, "Stability properties of constrained queueing system sand scheduling policies for maximum throughput in multihop radio networks," IEEE Transactions on Automatic Control, Dec. 1992, vol. 37, No. 12, pp. 1936-1948.
Tassiulas, "Linear complexity algorithms for maximum throughput in radio networks and input queued switches," IEEE, 1998, pp. 533-539.
Zhao and Raychaudhuri, "Scalability and performance evaluation of hierarchical hybrid wireless networks," to appear IEEE Transactions on Networking, 2009, pp. 1-14.
Bill Lin, "A Simple Rate Quantization Method for Service Guarantees with Input-Queued Switches," 43rd Annual Allerton Conference on Communication, Control, and Computing, Monticello, IL Sep. 30, 2005.
T.S Ferguson, "Linear Programming A Concise Introduction" (65 pages) published before Dec. 13, 2011.

\* cited by examiner

20

21a → ( I ) − 4X1 − 3X2 ≤ −20

21b → ( II ) − 2X1 + 7X2 ≤ 24

21c → ( III ) 3X1 − 2X2 ≤ 15

21d → ( IV ) − X2 ≤ 2

21e → ( V ) − 4X1 − 3X2 ≤ −37

25

$$\begin{bmatrix} -4 & -3 \\ -2 & 7 \\ 3 & -2 \\ 0 & -1 \\ -4 & -3 \end{bmatrix} \begin{bmatrix} X1 \\ X2 \end{bmatrix} \leq \begin{bmatrix} -20 \\ 24 \\ 15 \\ 2 \\ -37 \end{bmatrix}$$

21a → (I)  $\begin{bmatrix} -4 & -3 \\ -2 & 7 \end{bmatrix} \begin{bmatrix} X1(P12) \\ X2(P12) \end{bmatrix} = \begin{bmatrix} -20 \\ 24 \end{bmatrix}$
21b → (II)

37a $\begin{bmatrix} X1(P12) \\ X2(P12) \end{bmatrix} = \begin{bmatrix} -4 & -3 \\ -2 & 7 \end{bmatrix}^{-1} \begin{bmatrix} -20 \\ 24 \end{bmatrix} = \begin{bmatrix} 2 \\ 4 \end{bmatrix}$

FIG. 3a

36b $21a \rightarrow (\text{I}) \begin{bmatrix} -4 & -3 \\ 3 & -2 \end{bmatrix} \begin{bmatrix} X1(P13) \\ X2(P13) \end{bmatrix} = \begin{bmatrix} -20 \\ 15 \end{bmatrix}$ 37b $\begin{bmatrix} X1(P13) \\ X2(P13) \end{bmatrix} = \begin{bmatrix} -4 & -3 \\ 3 & -2 \end{bmatrix}^{-1} \begin{bmatrix} -20 \\ 15 \end{bmatrix} = \begin{bmatrix} 5 \\ 0 \end{bmatrix}$

FIG. 3b

36c $$21b \rightarrow (II) \begin{bmatrix} -2 & 7 \\ 3 & -2 \end{bmatrix} \begin{bmatrix} X1(P23) \\ X2(P23) \end{bmatrix} = \begin{bmatrix} 24 \\ 15 \end{bmatrix}$$

37c $$\begin{bmatrix} X1(P23) \\ X2(P23) \end{bmatrix} = \begin{bmatrix} -2 & 7 \\ 3 & -2 \end{bmatrix}^{-1} \begin{bmatrix} 24 \\ 15 \end{bmatrix} = \begin{bmatrix} 9 \\ 6 \end{bmatrix}$$

FIG. 3c

160a $\rightarrow$ $\begin{bmatrix} 1 & 0 \\ 0 & 1 \end{bmatrix}$    160b $\rightarrow$ $\begin{bmatrix} 0 & 1 \\ 1 & 0 \end{bmatrix}$

FIG. 16

161a $\rightarrow$ $P_1 = \begin{bmatrix} 1 & 0 & 0 \\ 0 & 1 & 0 \\ 0 & 0 & 1 \end{bmatrix}$    161b $\rightarrow$ $P_2 = \begin{bmatrix} 0 & 1 & 0 \\ 0 & 0 & 1 \\ 1 & 0 & 0 \end{bmatrix}$    161c $\rightarrow$ $P_3 = \begin{bmatrix} 0 & 0 & 1 \\ 1 & 0 & 0 \\ 0 & 1 & 0 \end{bmatrix}$ 161d $\rightarrow$ $P_4 = \begin{bmatrix} 1 & 0 & 0 \\ 0 & 0 & 1 \\ 0 & 1 & 0 \end{bmatrix}$    161e $\rightarrow$ $P_5 = \begin{bmatrix} 0 & 1 & 0 \\ 1 & 0 & 0 \\ 0 & 0 & 1 \end{bmatrix}$    161f $\rightarrow$ $P_6 = \begin{bmatrix} 0 & 0 & 1 \\ 0 & 1 & 0 \\ 1 & 0 & 0 \end{bmatrix}$

FIG. 16a

$$201 \longrightarrow \sum_{i=1}^{N} r_{ij} \leq 1, \forall j \qquad 202 \longrightarrow \sum_{j=1}^{N} r_{ij} \leq 1, \forall i$$

$$203 \longrightarrow \sum_{i=1}^{N} r_{ij} \quad 1, \forall j \qquad 204 \longrightarrow \sum_{j=1}^{N} r_{ij} \quad 1, \forall i$$

$$205 \longrightarrow R \leq \sum_{k=1}^{K} \Phi_k P_k \qquad 205a \longrightarrow R(i,j) \leq \sum_{k=1}^{K} \Phi_k P_k(i,j)$$

$$206 \longrightarrow BR \quad \sum_{k=1}^{K} \Phi_k \quad M \qquad 207 \longrightarrow \sum_{k=1}^{K} \Phi_k \quad 1$$

FIG. 20

$$R \leq \Phi_1 P_1 + \Phi_2 P_2 + \Phi_3 P_3 + \Phi_4 P_4 + \Phi_5 P_5 + \Phi_6 P_6 =$$

$$+\Phi_1 \begin{bmatrix} 1 & 0 & 0 \\ 0 & 1 & 0 \\ 0 & 0 & 1 \end{bmatrix} + \Phi_2 \begin{bmatrix} 0 & 1 & 0 \\ 0 & 0 & 1 \\ 1 & 0 & 0 \end{bmatrix} + \Phi_3 \begin{bmatrix} 0 & 0 & 1 \\ 1 & 0 & 0 \\ 0 & 1 & 0 \end{bmatrix} \leftarrow 210$$

$$+\Phi_4 \begin{bmatrix} 1 & 0 & 0 \\ 0 & 0 & 1 \\ 0 & 1 & 0 \end{bmatrix} + \Phi_5 \begin{bmatrix} 0 & 1 & 0 \\ 1 & 0 & 0 \\ 0 & 0 & 1 \end{bmatrix} + \Phi_6 \begin{bmatrix} 0 & 0 & 1 \\ 0 & 1 & 0 \\ 1 & 0 & 0 \end{bmatrix}$$

FIG. 21

$$R = \begin{bmatrix} r_{11} & r_{12} & r_{13} \\ r_{21} & r_{22} & r_{23} \\ r_{31} & r_{32} & r_{33} \end{bmatrix} \leftarrow 211$$

FIG. 21a

$$[\Phi_1 \ \Phi_2 \ \Phi_3 \ \Phi_4 \ \Phi_5 \ \Phi_6] \begin{bmatrix} 1 & 0 & 0 & 0 & 1 & 0 & 0 & 0 & 1 \\ 0 & 1 & 0 & 0 & 0 & 1 & 1 & 0 & 0 \\ 0 & 0 & 1 & 1 & 0 & 0 & 0 & 1 & 0 \\ 1 & 0 & 0 & 0 & 0 & 1 & 0 & 1 & 0 \\ 0 & 1 & 0 & 1 & 0 & 0 & 0 & 0 & 1 \\ 0 & 0 & 1 & 0 & 1 & 0 & 1 & 0 & 0 \end{bmatrix} =$$

$$Q = \begin{bmatrix} 1 & 0 & 0 & 0 & 1 & 0 & 0 & 0 & 1 \\ 0 & 1 & 0 & 0 & 0 & 1 & 1 & 0 & 0 \\ 0 & 0 & 1 & 1 & 0 & 0 & 0 & 1 & 0 \\ 1 & 0 & 0 & 0 & 0 & 1 & 0 & 1 & 0 \\ 0 & 1 & 0 & 1 & 0 & 0 & 0 & 0 & 1 \\ 0 & 0 & 1 & 0 & 1 & 0 & 1 & 0 & 0 \end{bmatrix} \quad \Phi = \begin{bmatrix} \Phi_1 \\ \Phi_2 \\ \Phi_3 \\ \Phi_4 \\ \Phi_5 \\ \Phi_6 \end{bmatrix} \quad R' = \begin{bmatrix} r_{11} \\ r_{12} \\ r_{13} \\ r_{21} \\ r_{22} \\ r_{23} \\ r_{31} \\ r_{32} \\ r_{33} \end{bmatrix}$$

FIG. 22a

$$Q = \begin{bmatrix} 1 & 0 & 0 & 0 & \cdots \\ 0 & 1 & 0 & 0 & \cdots \\ 0 & 0 & 1 & 1 & \cdots \\ 1 & 0 & 0 & 0 & \cdots \\ \cdots & \cdots & \cdots & \cdots & \cdots \\ \cdots & \cdots & \cdots & \cdots & \cdots \\ \cdots & \cdots & \cdots & \cdots & \cdots \\ \cdots & \cdots & \cdots & \cdots & \cdots \end{bmatrix} \quad \Phi = \begin{bmatrix} \Phi_1 \\ \Phi_2 \\ \Phi_3 \\ \vdots \\ \Phi_M \end{bmatrix} \quad R' = \begin{bmatrix} r_{11} \\ \vdots \\ r_{1N} \\ r_{21} \\ \vdots \\ r_{2N} \\ r_{N1} \\ \vdots \\ r_{NN} \end{bmatrix}$$

FIG. 23

APPARATUS AND METHOD FOR USING AND SOLVING LINEAR PROGRAMMING PROBLEM AND APPLICATIONS THEREOF

FIELD OF THE INVENTION

The present invention relates generally to solving generalized linear programming problems and, more particularly, for practical applications for solving generalized linear programming problems.

BACKGROUND OF THE INVENTION

In many practical applications, it is required to optimize (maximize or minimize) a linear objective function, subject to linear inequality (and sometimes also equality) constraints (also known as Linear Programming (LP)). Given a polytope and a real-value affixed function defined on this polytope, a linear programming method aims to find a point on the polytope where function has the smallest (or largest) value if such a point exists, by searching through the polytope vertices. Information about linear programming and related problems can be found in the publication by T. S. Ferguson, "LINEAR PROGRAMMING, A Concise Introduction", which is incorporated in its entirety for all purposes as if fully set forth herein Linear programming problems are commonly expressed in canonical form such as the standard maximum problem: Maximize $c^t x$ ($=c_1 x_1 + \ldots + c_n x_n$) subject to $Ax \leq b$, where x represents the vector of variables (to be determined), c and b are vectors of known coefficients and A is a known matrix (M×N) of coefficients defining the problem. The expression $c^t x$ is the objective function to be maximized. The set of inequalities constraints $Ax \leq b$ specifies a convex polytope over which the objective function is to be optimized, which implies that every local minimum is a global minimum. Similarly, a linear function is a concave function, thus every local maximum is a global maximum. Similarly, the standard minimum problem is to minimize $y^t b$ ($=y_1 b_1 + \ldots + y_m b_m$) subject to $y^t A \geq c^t$, where y represents the vector of variables (to be determined), c and b are vectors of known coefficients and A is a known matrix of coefficients defining the problem. The standard minimum problem is defined as the dual of the standard maximum problem, and solving one commonly result in the solution for the other, as $c^t x = y^t b$ at the optimal point (assuming both problems are feasible).

Linear programming can be applied to various fields, such as business and economics, as well as for engineering. Industries that use linear programming models include transportation, energy, telecommunications, and manufacturing. LP has been further proven useful in modeling diverse types of problems in planning, routing, scheduling, assignment, and design.

As part of solving the linear programming problem, and also in many practical problems, it is required to analyze the constraints set $Ax \leq b$, known as the constraints satisfaction problem. Such analysis is required in many problems of artificial intelligence and operation research. For example, it is required to find out if a constraint set is solvable or alternatively if it is infeasible and there is no feasible region. The problem of finding a feasible set to a system of linear inequalities can be formalized as a linear programming problem in which the objective function is the zero function. In another example, it may be useful to find out which of the constraints is not part of the polytope defined by the constraints set (and thus such constraints can be omitted without affecting the solution). Further, it may be useful to find the vertices of the polyhedra defined by the constraints set, since under the convexity assumptions the solution to a linear programming problem is likely to reside in such vertex.

Most current methods for solving constraints satisfaction and linear programming problems involves high complexity calculations, and may require the use of heuristic and combinatorial search methods. Few suggested solving algorithms (such as the simplex algorithm) require limiting the problem, such as requiring that the variables are non-negative or that the right hand side constants b are non-negative. Further, some methods require a known starting feasible point. For example, the simplex algorithm created by the American mathematician George Dantzig is a popular method for solving LP problems, and it is based on the concept of simplex, which is a polytope of N+1 vertices in N dimensions. This boundary method algorithm uses walking along the edges of the polytope to vertices with higher objective function values, until either an optimum extreme point is found or an unbounded edge along which the objective function diverges is found. However, the simplex algorithm assumes that the variables x and the coefficients b are non-negative. Further, the simplex algorithm involves the complexity of inverting matrices of the size of the number of constraints. As such, the complexity is high in case of a large number of constraints.

Other methods, referred to as interior point methods, start with a point in the (relative) interior of the feasible set, and continue in the interior until they reach a near optimal solution. These methods require a feasible point to start from, and thus cannot be applied in cases where such starting point is not known.

Further, in many cases there is no objective function, yet the constraints set needs to be analyzed. For example, it may be required to find out if the constraints set is feasible, or to determine which constraints do not affect the feasible region and can thus be eliminated. Since most algorithms are focusing on the objective function, such methods may not be useful for such analysis of a set of constraints.

SUMMARY OF THE INVENTION

In one aspect of the present invention, a method for analyzing a set of M inequalities constraints relating to N variables wherein M>N and apparatus for executing the method are described. The method comprising the steps of (a) selecting a sub-set of P constraints wherein P>N, (b) calculating an initial feasible region (IFR) defined by one or more endpoints and the N constraints defined by each endpoints, wherein the endpoints are the intersections of N constraints out of said selected sub-set, treated as equalities, (c) selecting a constraint out of the M constraints which is not part of the selected sub-set, and (d) calculating a temporary feasible region (TFR) by manipulating the initial feasible region versus the first constraint.

The method can be used for analyzing the whole set of the M inequalities constraints, further comprising the steps of (a) selecting a constraint which was not yet selected, and (b) updating said temporary feasible region (TFR) by manipulating the temporary feasible region (TFR) versus said selected constraint, and wherein these steps are repeated until all the constraints are selected, and wherein the last TFR is declared as the feasible region for said set of M inequalities constraints. The method may further be used for checking feasibility of the set of M inequalities constraints, further comprising a step after step (b), step (d) or step (f) of checking the feasibility of the IFR, and wherein if a feasible IFR is not obtained, declaring the set as non-feasible.

The method may further be used for checking activity of constraints on the set of M inequalities constraints, the method further comprising a step after steps (c) or (e) of checking the TFR to be an open or a closed region, and declaring any selected constraint that is not part of the TFR as non-active. In the case wherein the TFR is a closed region, the selected constraint is declared as non-active if all the endpoints defining the TFR satisfy the selected constraint.

The method steps may be stored as part of software or firmware in a memory, and executed by a processor configured by the memory to perform the method steps.

The method, or standard linear programming method, may be used for scheduling, as to determine the states order and the length of stay in each state, of a switching system based on a switch having a plurality of P input ports for receiving incoming streams and a plurality of Q output ports (Q=P or Q≠P) for outputting outgoing streams. The switch is configurable to be in multiple states, wherein in each state each of the input ports is connected to a single output port and wherein each of the output ports is connected to a single input port for transferring the incoming streams into outgoing streams.

The switch may be used for routing digital data streams in a digital data networking application which is part of a LAN (Local Area Network), WAN (Wide Area Network), MAN (Metropolitan Area Network) or the Internet. The switch may be OSI (Open Systems Interconnection) layer 2 or layer 3 switch, and operative to receive and route a plurality of digital data streams carrying information using TDM (Time Division Multiplexing) scheme. The digital data streams may include packets, cells or frames, and the switching may respectively be packet, cell or frame based. The switch routing may be based on IP (Internet Protocol), TCP/IP protocol, Border Gateway Protocol (BGP), or Multi-Protocol Label Switching (MPLS).

The digital data streams may be carried over a conductive medium, and wherein said input ports and output ports include connectors, or may be carried over a non-conductive medium, and wherein said input and output ports include antennas or fiber-optic connectors.

The method or standard linear programming method may be used in a control system that models, monitors or regulates a physical system. The coefficients or parameters of the problem are based on input from one or more sensors (digital or analog), and the calculated solution may be used to control one or more actuators (digital or analog).

The method may be used as part of cloud computing services. The method may be used to solve or support the solving of microeconomics, engineering, design and management problems. In particular, the method may be used to solve or to aid in solving problems relating to planning, production, transportation, technology, capital budgeting, warehouse location, covering and packing, scheduling, data transfer and graphs, resources allocation, allocating data paths, planning, routing, assignment, and design and other deterministic or stochastic linear problems and models.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be learned by the practice of the invention as set forth hereinafter. It is intended that all such additional apparatus and advantages be included within this description, be within the scope of the present invention, and be protected by the accompanying claims.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning.

BRIEF DESCRIPTION OF THE FIGURES

The invention is herein described, by way of non-limiting examples only, with reference to the accompanying figures and drawings, wherein like designations denote like elements. Understanding that these drawings only provide information concerning typical embodiments of the invention and are not therefore to be considered limiting in scope:

FIG. 2 illustrates an example of a set of constraints according to one aspect of the invention;

FIGS. 3a, 3b and 3c illustrate schematically calculating of intersection points of the first example of constraints according to one aspect of the invention;

FIG. 16 illustrates 2×2 permutation matrices;

FIG. 16a illustrates 3×3 permutation matrices;

FIG. 20 illustrates schematically the inequalities and equations relating to traffic rate matrices;

FIGS. 21 and 21a illustrate schematically the inequalities and equations relating to 3×3 traffic rate matrices;

FIGS. 22 and 22a illustrate alternative formulation of the inequalities and equations relating to 3×3 traffic rate matrices;

FIG. 23 illustrates the matrix and vectors relating to the general case of an N×N switching system;

DETAILED DESCRIPTION OF EMBODIMENTS

Figure 1:
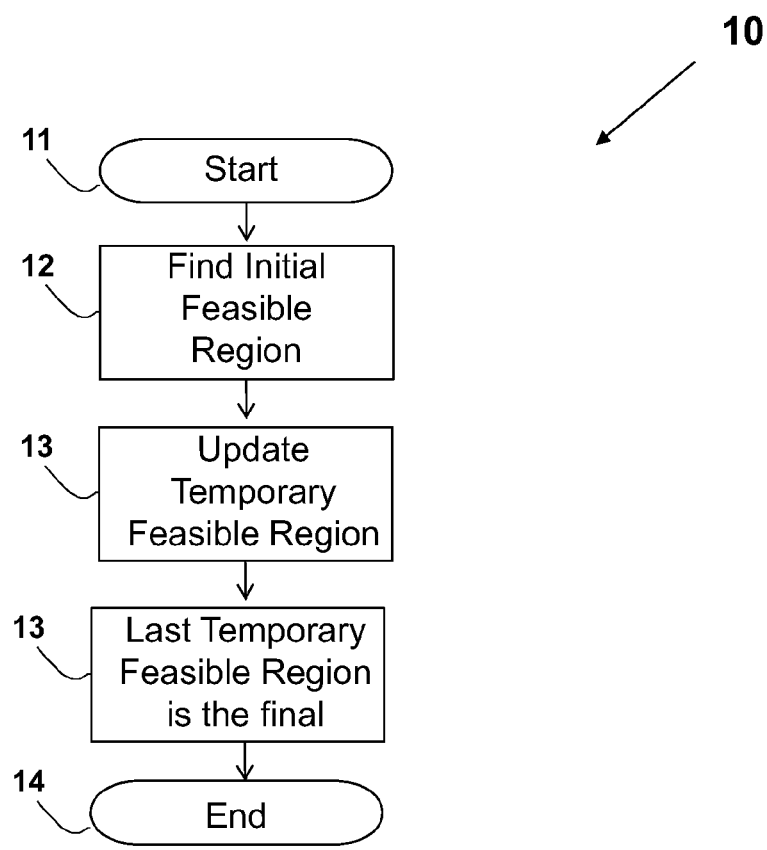
FIG. 1 illustrates schematically a simplified flow chart of a method for solving generalized linear programming problems according to one aspect of the invention.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Unless specifically stated otherwise, it is appreciated that throughout the specification discussions, utilizing terms such as "processing", "computing", "calculating", "determining", "generating", "creating" or the like, refer to the action and/or processes of a computer or computing system, or processor or similar electronic computing device. Such devices manipulate and/or transform data represented as physical, such as electronic, quantities within the computing system's registers and/or memories into other data, similarly represented as physical quantities within the computing system's memories, registers or other such information storage, transmission or display devices. Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value must be obtained prior to processing it, although some of the corresponding processing may be performed prior to, concurrently with, and/or after the read operation).

Embodiments of the present invention may use terms such as processor, computer, apparatus, system, sub-system, module, unit, and device (in single or plural form) for performing the operations herein. This may be specially constructed for the desired purposes, or it may contain a general purpose computer selectively activated or reconfigured by a computer program stored in the computer. Such a computer program may be stored in a computer readable storage medium such as, but not limited to, any type of disk including, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus, unless specifically stated otherwise. Various general purpose systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages may be used to implement the teachings of the inventions as described herein.

In one aspect of the invention, the inequality constraints set processing involves creating and updating a feasible region, as described in the flow 10 in FIG. 1. A feasible region corresponding to a list of inequality constraints relates to the set of all 'x's that satisfy all the inequality constraints. A feasible region can be defined by the corresponding inequality constraints set, or by the vertices of intersection of subsets of the inequality constraints set (wherein each point is also referring to the reference numbers of the constraints defined with it). The feasible region (the initial, the temporary or the final) is defined by the basic feasible solutions, which are calculated as the vertices of the polyhedron formed by the subset of the constraints set treated as equalities. In the first step 'Start' 11, the Complete Constraint Set (CCS) is received. At the second step "Find Initial Feasible Region" 12, the Initial Feasible Region (IFR) is calculated, using a small number of constraints forming a sub-set of the CCS. The IFR is the first Temporary Feasible Region (TFR). In the step "Update Temporary Feasible Region" 13 the remaining constraints (which are part of the CCS but not part of the IFR) are incrementally introduced to update (if required) the TFR.

After all the constraints have been processed to impact the TFR, the last TFR defines the feasible region of the CCS in step "Last Temporary Feasible Region is the final" 13, ending the process in step "End" 14. Since linear functions are both convex and concave, the optimum value is attained at the vertices of the final feasible region polyhedra, by the maximum principle for convex functions or alternatively by the minimum principles for concave functions.

One aspect of the invention may be exampled (for better clarity and ease of presentation) by using two variables $X1$ and $X2$, and a set of five inequality constraints 20 serving as the Complete Constraint Set (CCS) as shown in FIG. 2. The constraints involved are (I) $-4X1-3X2 \leq -20$ 21a, (II) $-2X1+7X2 \leq 24$ 21b, (III) $3X1-2X2 \leq 15$ 21c, (IV) $-X2 \leq 2$ 21d, and (V) $-4X1-3X2 \leq -37$ 21e. The CCS can also be written as the more formal matrix form $Ax \leq b$ shown as 25 in FIG. 2, showing the coefficients matrix 'A' 21, the variable vector 'x' [denoting the vector $(X1, X2)$] 22 and the coefficients vector 'b' 23.

Figure 3:
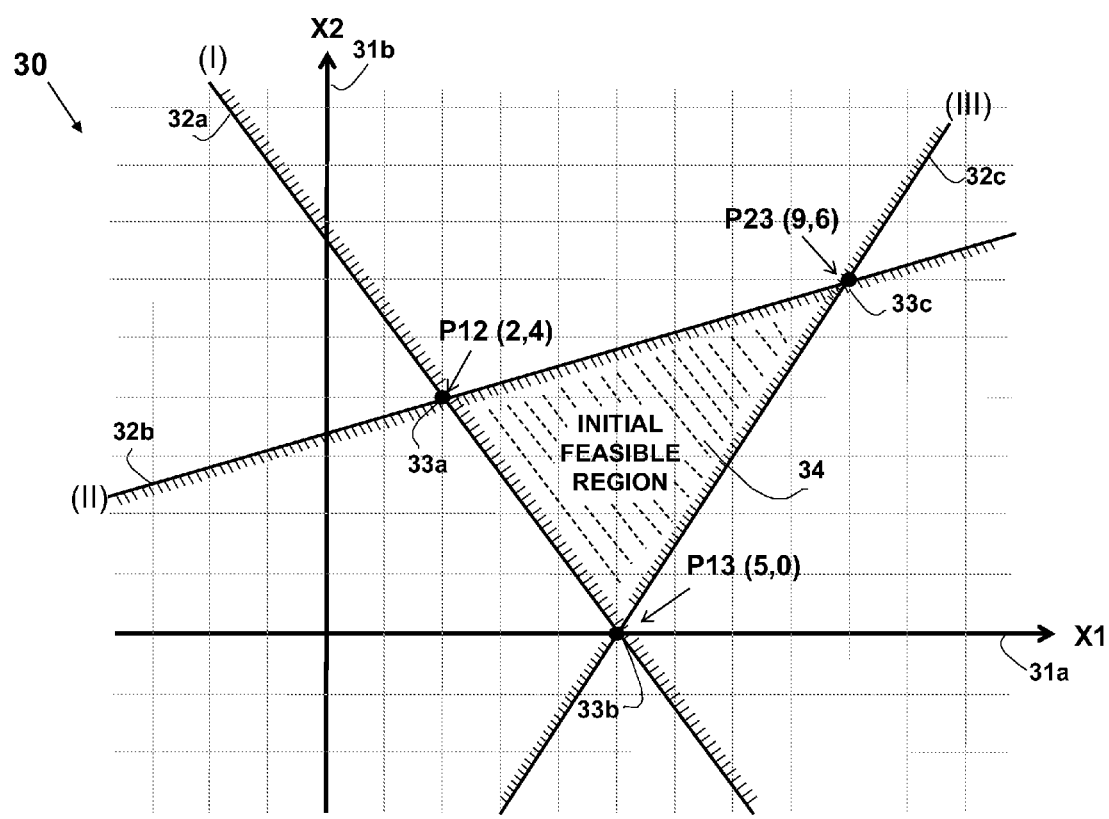
FIG. 3 depicts schematically a two-dimensional chart graph of few constraints and the related feasible region of a first example according to one aspect of the invention.

Since two variables are involved ($X1$ and $X2$) in the example, three constraints are used for obtaining the Initial Feasible Region (IFR) polygon. Any three constraints may be selected. The example uses constraints (I) 21a, (II) 21b and (III) 21c for determination of the IFR, as shown graphically as a graph 30 in FIG. 3. The graph 30 shows ($X1$, $X2$) points using the horizontal axis $X1$ 31a and the vertical axis $X2$ 31b. The constraint (I) 21a and its feasible area is shown as line 32a, the constraint (II) 21b and its feasible area is shown as line 32b and the constraint (III) 21c and its feasible area is shown as line 32c. The three constraints (treated as equalities) form three intersection points denoted as P12 33a, P13 33b and P23 33c. The point P12 33a is (2,4) and is obtained at the intersection of constraint (I) 32a and constraint (II) 32b, the point P13 33b is (5,0) and is obtained at the intersection of constraint (I) 32a and constraint (III) 32c, and the point P23 33c is (9,6) and is obtained at the intersection of constraint (II) 32b and constraint (III) 32c. The three points (together with the corresponding numbers of the constraints intersecting in each point) uniquely identify the feasible region polygon 34, denoted as the IFR. The calculation of the intersection points P12 33a, P13 33b and P23 33c is known in the art, for example by means of matrix inversion as shown in FIGS. 3a, 3b and 3c. FIG. 3a shows the calculation of point P12 33a relevant subset 36a of the constraints system 25 shown in FIG. 2 using equalities, solved using matrix inversion as shown in calculation 37a. FIG. 3b shows the calculation of point P13 33b relevant subset 36b of the constraints system 25 shown in FIG. 2 using equalities, solved using matrix inversion as shown in calculation 37b. FIG. 3c shows the calculation of point P23 33c relevant subset 36e of the constraints system 25 shown in FIG. 2 using equalities, solved using matrix inversion as shown in calculation 37c.

Figure 4:
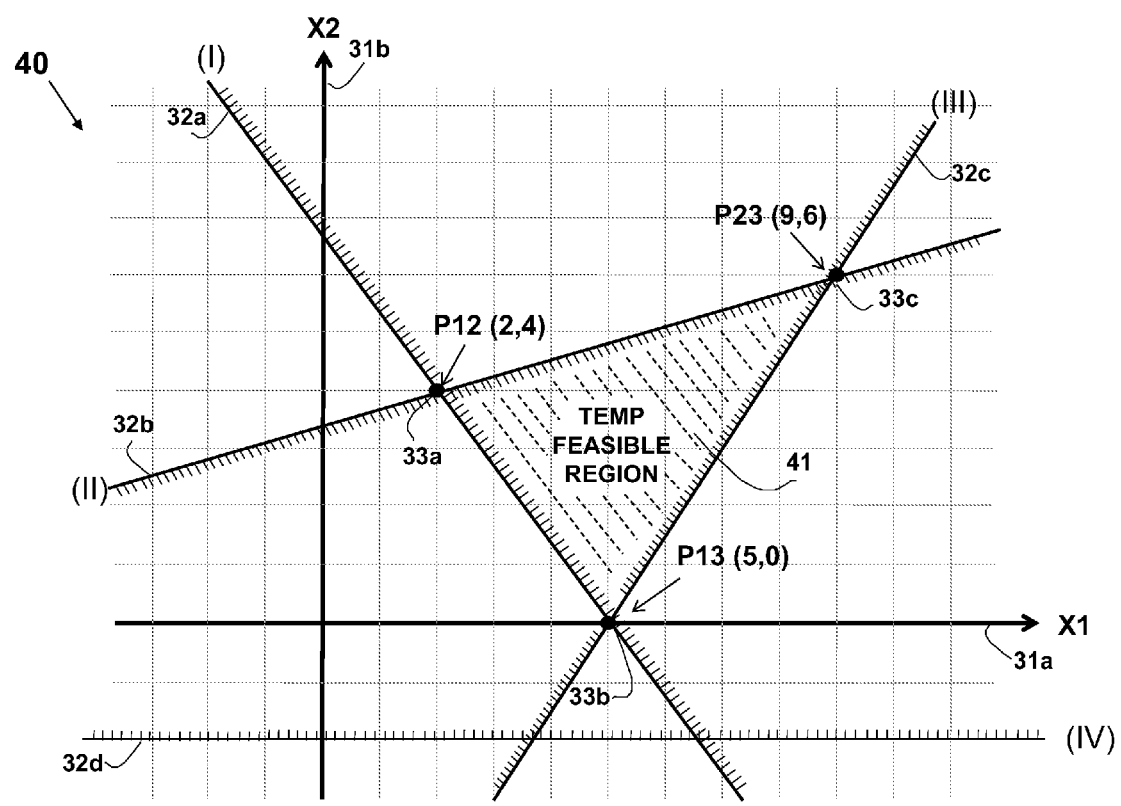
FIG. 4 depicts schematically a two-dimensional chart graph of few constraints and the related feasible region of a second example according to one aspect of the invention.

The IFR 34 shown in FIG. 3 serves the initial TFR polygon. The constraints which are part of the CCS and were not used to calculate the IFR 34 are compared one at a time with the current TFR. Hence, the constraint (IV) 21d is the first to be processed as the next step. The three vertices of the TFR (which is now the IFR) P12 33a, P13 33b and P23 33c are all checked to satisfy the constraint (IV) 21d. FIG. 4 shows a graph 40 depicting the TFR 41 (which is identical to IFR 34) and the line 32d relating to the constraint (IV) 21d. As shown in FIG. 4 and as can be calculated, all the TFR 41 vertices P12 33a, P13 33b and P23 33c satisfy the constraint (IV) 21d. In such a case, the constraint (IV) 21d is not impacting or changing the TFR 41, and can be omitted without any change of the final feasible region. Similarly, any other constraint for which all points of the TFR polygon are satisfied, is not limiting the feasible region of the CCS, and if omitted will not change the CCS solution.

Alternatively, a constraint may be such that all the TFR vertices do not satisfy. In such a case, the CCS is infeasible due to being inconsistent as the constraints cannot be satisfied jointly, and there is no feasible region available. There is no need to check any other constraints or to calculate new TFR. The case wherein all of the vertices of a TFR do not satisfy a single constraint is enough to identify the whole CCS as inconsistent and as non-available feasible region. For example, if the constraint (IV) 21d was changed to $-X2 \geq 2$, the CCS 20 would be infeasible since all the TFR 41 vertices do not satisfy such a constraint.

Figure 5:
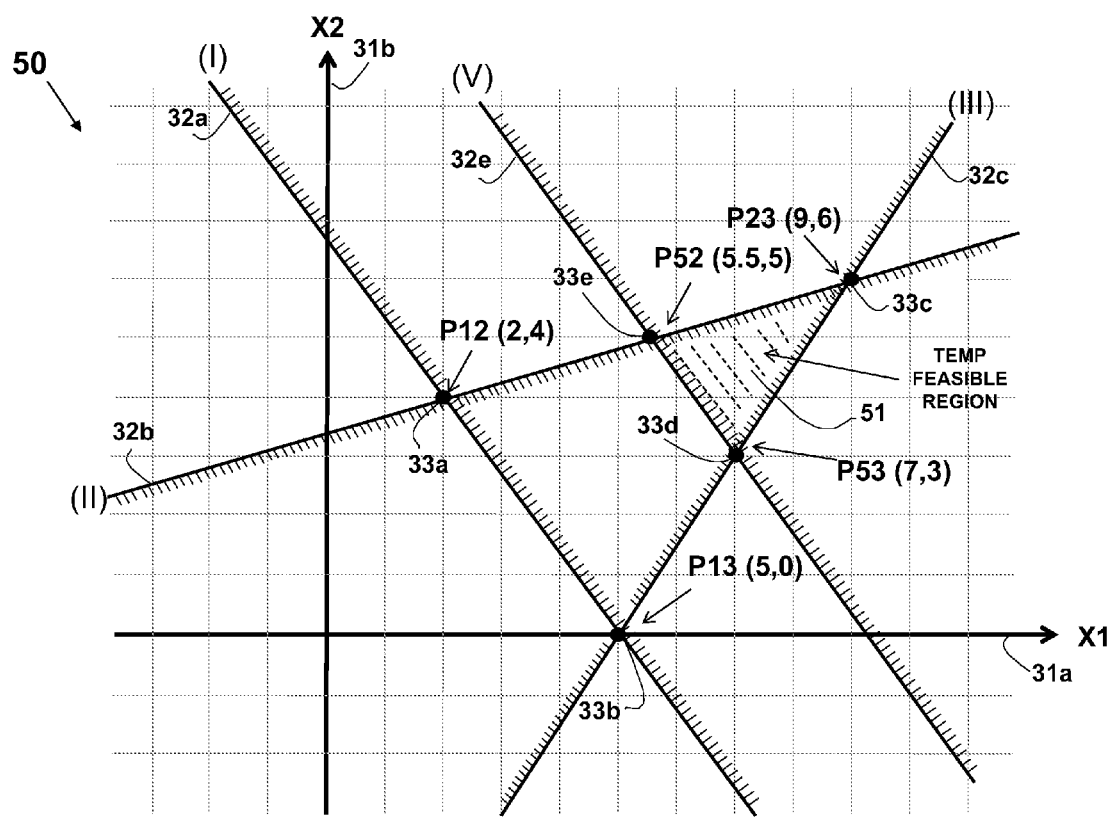
FIG. 5 depicts schematically a two-dimensional chart graph of few constraints and the related feasible region of a third example according to one aspect of the invention.

In the next step, constraint (V) 21e is processed. The three vertices of the TFR 41 P12 33a, P13 33b and P23 33c are all checked to satisfy the constraint (V) 21e. FIG. 5 shows a graph 50 depicting the constraints system and the line 32e relating to the constraint (V) 21e. The point P23 33c satisfies the constraint (V) 21e, while the points P13 33b and P12 33a do not satisfy this current processed constraint. In such a case, the TFR polygon 41 is updated as follows: The point or points that are satisfying the processed constraint remain part of the updated TFR. The points that do not satisfy the processed constraint are excluded from the TFR. Further, new points are calculated based on the constraints forming the points that remain part of the TFR. In the example, since the satisfying point P23 33c has been formed by the constraints (II) 21b (represented as line 32b) and (III) 21c (represented as line 32c), the new vertices to be calculated are P52 (5.5,5) 33e formed at the intersection of constraints (II) 21b (represented as line 32b) and (V) 21e (represented as line 32e), and P53 (7,3) 33d formed at the intersection of constraints (III) 21c (represented as line 32c) and (V) 21e (represented as line 32e). The new TFR 51 is shown in FIG. 5, defined by the vertices P52 33e, P53 33d and P23 33c. Further, the new active constraints impacting and forming the TFR 51 are constraints (V) 21e (represented as line 32e), (II) 21b (represented as line 32b) and (III) 21c (represented as line 32c). Constraint (I) 21a (represented as line 32a) is clearly not impacting the TFR 51 anymore, and thus can be removed without changing the feasible region of the whole CCS. The current TFR 51 may be used for further processing of additional constraints, if any. Since the CCS 20 includes only five constraints which were all processed, the TFR 51 serves as the final feasible region of the whole CCS 20, and the active constraints are only the constraints (V) 21e, (II) 21b and (III) 21c. Constraints (I) 21a and (IV) 21d (not shown in FIG. 5) are not impacting the feasible region.

Figure 6:
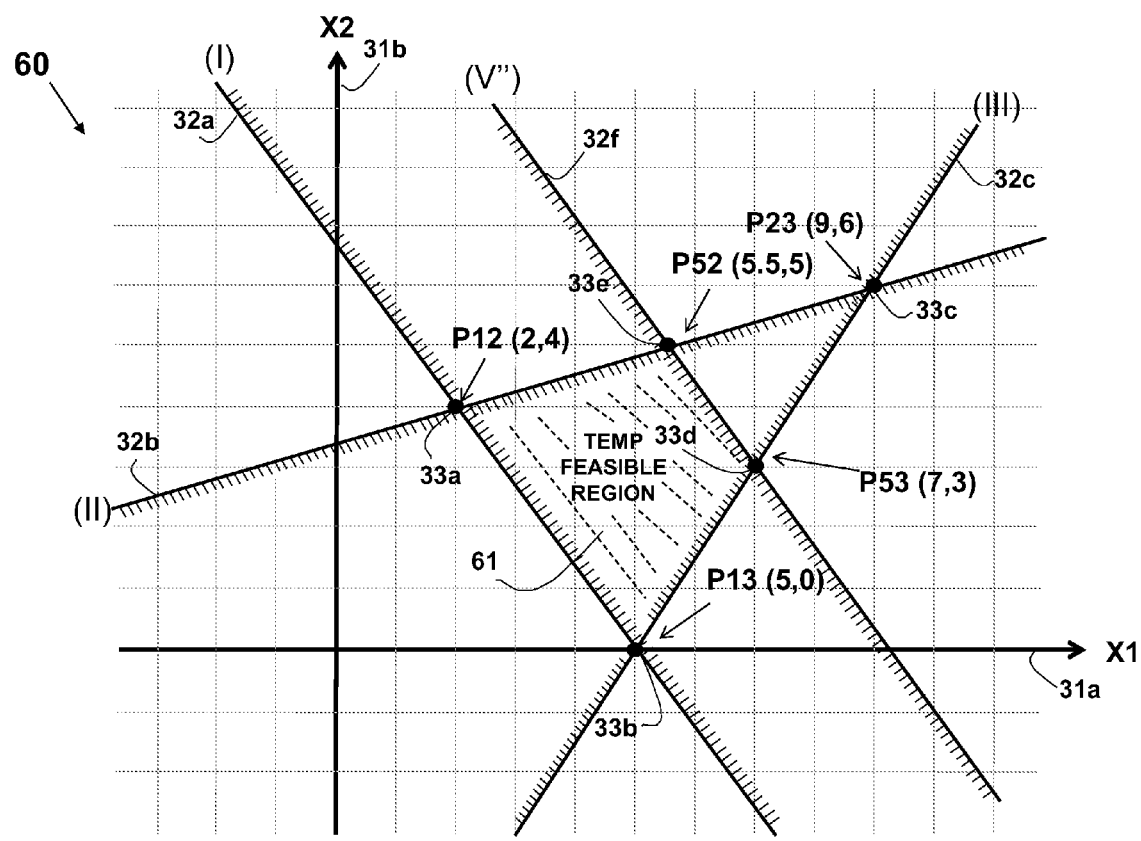
FIG. 6 depicts schematically a two-dimensional chart graph of few constraints and the related feasible region of a fourth example according to one aspect of the invention.

In another example, the constraint (V) 21e is substituted with the constraint (V'') $-4X1-3X2 \geq -37$ 21f (or $4X1+3X2 < 37$). The three vertices of the TFR 41 P12 33a, P13 33b and P23 33c are all checked to satisfy the constraint (V'') 21f. FIG. 6 shows the graph 60 depicting the constraints system and the line 32f relating to the constraint (V'') 21f. The point P23 33c does not satisfy the constraint (V'') 21f, while the points P13 33b and P12 33a do satisfy this current processed constraint. In such a case, since the satisfying points P12 33a is formed by the constraints (II) 21b and (I) 21a, the new end points to be calculated are P52 (5.5,5) 33e formed at the intersection of constraints (II) 21b and (V') 21f and P53 (7,3) 33d formed at the intersection of constraints (III) 21c and (V'') 21f. The new TFR 61 is shown in FIG. 6, defined by the vertices P52 33e, P53 33d, P12 33a and P13 33b. Further, the new active constraints impacting and forming the TFR 61 are constraints (V''') 21f, (I) 21a, (II) 21b and (III) 21c. This current TFR 61 may be used for further processing of additional constraints, if any.

Figure 7:
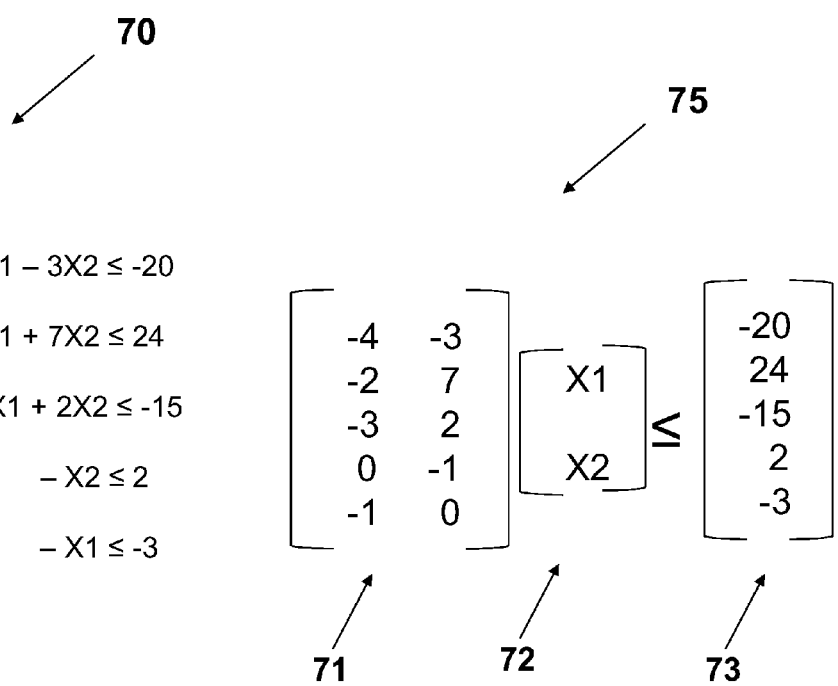
FIG. 7 illustrates an example of a set of constraints according to one aspect of the invention.

The IFR 34 and the TFR 51 in the above examples consisted of a bounded region, confined by few constraints and having a finite area. Since in many practical applications the variables are limited, a bounded feasible region may result. However, in some applications the feasible region, either the initial one or the temporary one (or both) may be an open region having an infinite area and not limited in one or more dimensions. Such an example using two variables X1 and X2 and a set of five inequality constraints 70 serving as the Complete Constraint Set (CCS) is shown in FIG. 7. The constraints involved are (I') $-4X1-3X2 \leq -20$ 71a, (II') $-2X1+7X2 \leq 24$ 71b, (III') $-3X1+2X2 \leq -15$ 71c, (IV') $-X2 \leq 2$ 71d and (V') $-X1 \leq -3$ 71e. The CCS can also be written as a more formal matrix form $Ax \leq b$ shown as 75 in FIG. 7, showing the coefficients matrix 'A' 71, the variable vector 'x' [denoting the vector (X1, X2)] 72 and the coefficients vector 'b' 73.

Figure 8:
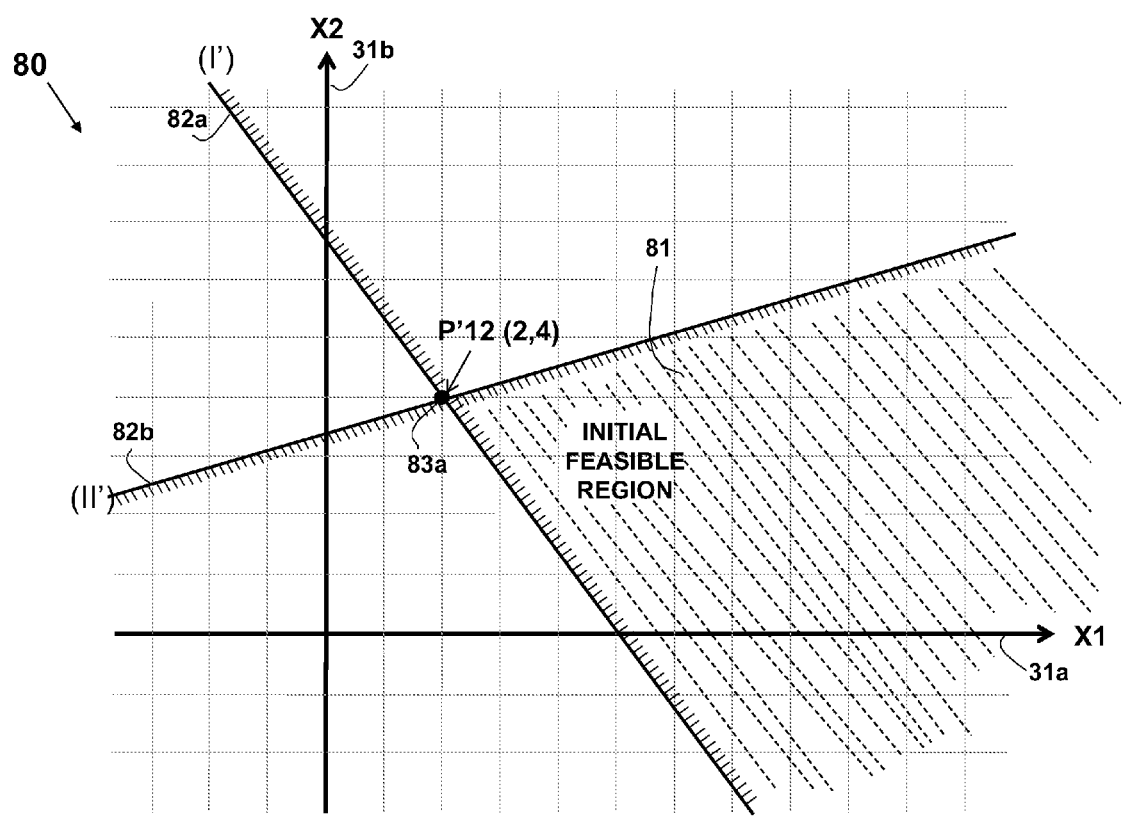
FIG. 8 depicts schematically a two-dimensional chart graph of few constraints and the related feasible region of an example according to one aspect of the invention.

Two constraints are used for obtaining the Initial Feasible Region (IFR) polygon. Any three constraints may be selected. The example uses constraints (I') 71a and (II') 71b for determination of the IFR, as shown graphically as graph 80 in FIG. 8. The graph 80 shows (X1, X2) points using the horizontal axis X1 31a and the vertical axis X2 31b. The constraint (I') 71a and its feasible area is shown as line 82a and the constraint (II') 71b and its feasible area is shown as line 82b. The two constraints (treated as equalities) form an intersection point denoted as P'12 83a. The point P'12 83a is (2, 4) and is obtained at the intersection of lines representing the constraint (I') 82a and the constraint (II') 82b. The point P'12 83a (together with the corresponding numbers of the constraints intersecting at this point) uniquely identifies the feasible region 81, denoted as the IFR for this example.

Figure 9:
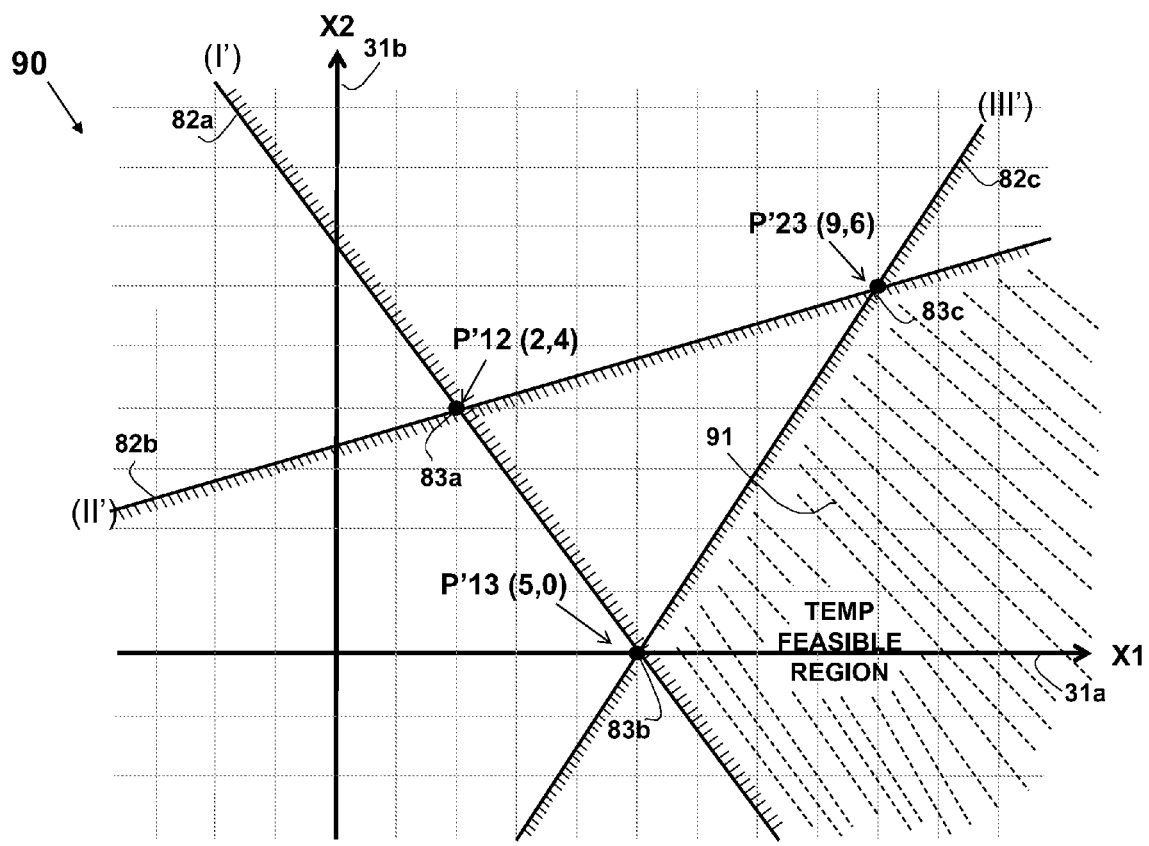
FIG. 9 depicts schematically a two-dimensional chart graph of few constraints and the related feasible region of an example according to one aspect of the invention.
Figure 10:
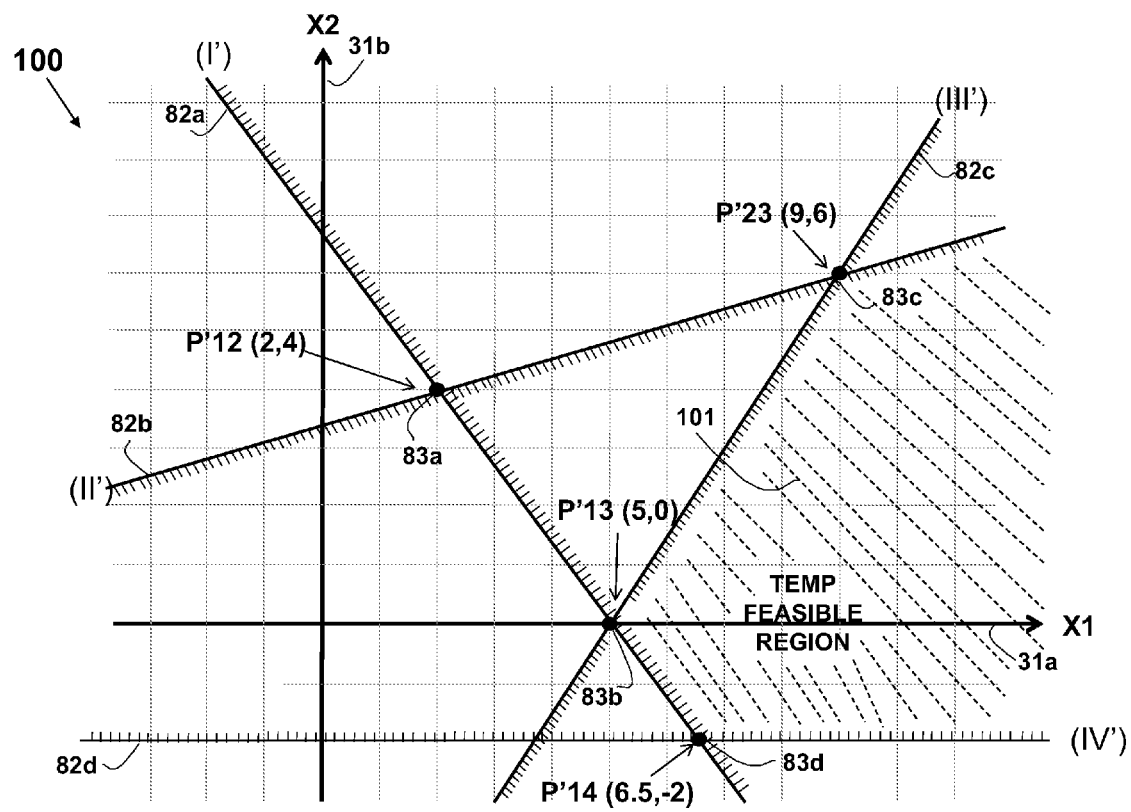
FIG. 10 depicts schematically a two-dimensional chart graph of few constraints and the related feasible region of an example according to one aspect of the invention.

At the next step, the IFR 81 serves as a TFR and the next constraint (III') 71c is processed. As shown in graph 90 in FIG. 9 the constraint (III') 71c is represented as a line 82c and intersects with the line representing a constraint (I') 71a in point P'13 (5,0) 83b and with the line representing a constraint (II') 71b in point P'23 (9, 6) 83c. The newly formed TFR after this step is shown as area 91, having end points P'13 (5, 0) 83b and P'23 (9,6) 83c and confined by the three constraints (I') 71a, (II') 71b and (III') 71c. The TFR 91 is an open structure having infinite area. Similarly, at the next step, the IFR 81 of FIG. 8 serves as a TFR and the next constraint (IV') 71d is processed. As shown in graph 100 in FIG. 10 the constraint (IV') 71d is represented as line 82d and intersect with constraint (I') 71a in point P'14 (6.5,−2) 83d. The newly formed TFR after this step is shown as area 101, having end points P'13 (5,0) 83b, P'23 (9,6) 83c and P'14 (6.5,−2) 83d, and confined by the four lines representing constraints (I') 71a, (II') 71b, (III') 71c and (IV') 71d. The TFR 101 is an open structure having infinite area. In another example, an added constraint can 'close' the TFR to result in a closed TFR, to be handled as such when new constraints are introduced.

At the next step, the IFR 101 serves as a TFR and the next constraint (V') 71e is processed. Since the TFR 101 satisfies the constraint (V') 71e, this constraint does not impact the current TFR 101, and can be omitted without changing the feasible area of CCS 70. In the case that the constraint (V''') 71e is changed to be (V''') $X1 \leq -3$, clearly the whole TFR 101 does not satisfy such constraint and thus the CCS 70 is infeasible and does not describe a feasible region.

In the general case, N variables $x_i$, i=1, 2, ... N are subject to a set of M constraints $C_i$, i=1, 2 ... M, wherein $C_j$: $a_{1,j}*x_1+a_{2,j}*x_2+ \ldots +a_{N,j}*x_N \leq b_j$. The constraints can be expressed in a canonical form as the constraints set $Ax \leq b$, wherein A is an M×N matrix of the constraints coefficients. Unlike the classic LP problem, there is no requirement for non-negative variables (such as $x_i \geq 0$) or for non-negative right hand constants b (such as $b_i \geq 0$). Further, it is assumed that M>N.

Figure 11:
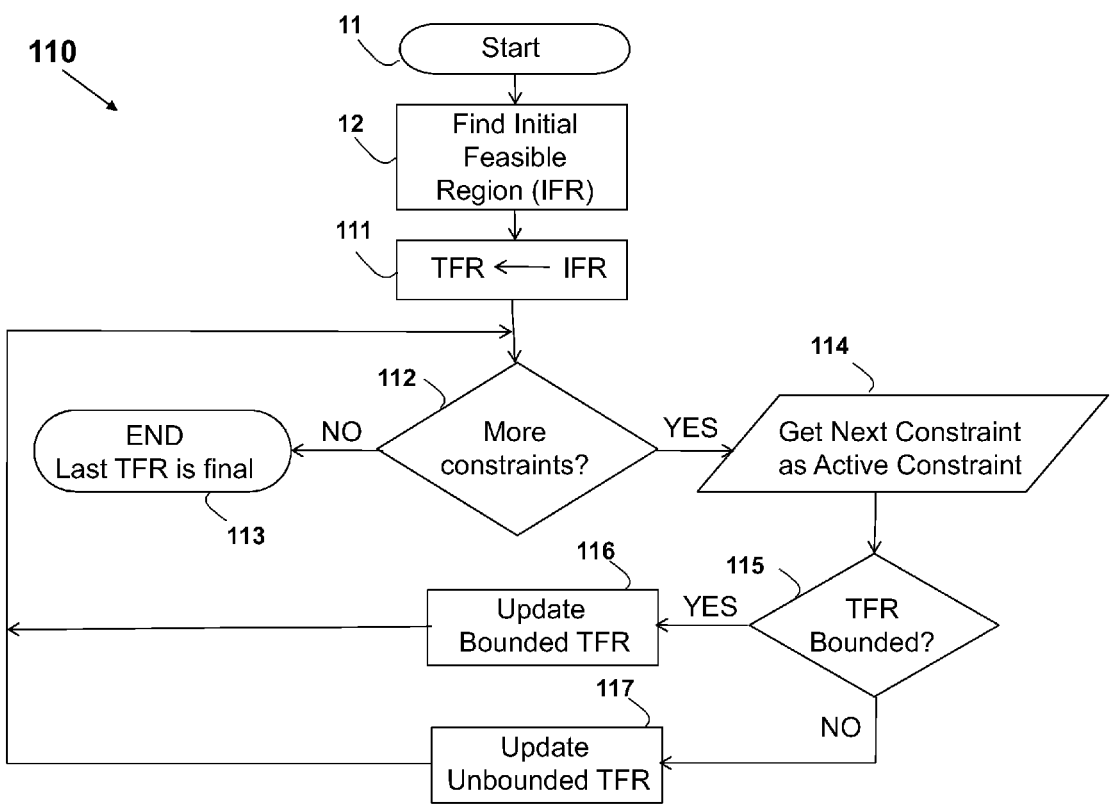
FIG. 11 illustrates schematically a simplified flow chart of a method for solving generalized linear programming problems according to one aspect of the invention.

The method for analyzing the constraints set is shown as flow-chart 110 in FIG. 11. After the 'Start' step 11, the IFR (Initial Feasible Region) is calculated in 'Find IFR' step 12. In this step, a subset of the constraints set is used to calculate the vertices of a polytope based on the selected constraints. The 'Find IFR' step 12 is described in details in flow chart 120 in FIG. 12.

Figure 12:
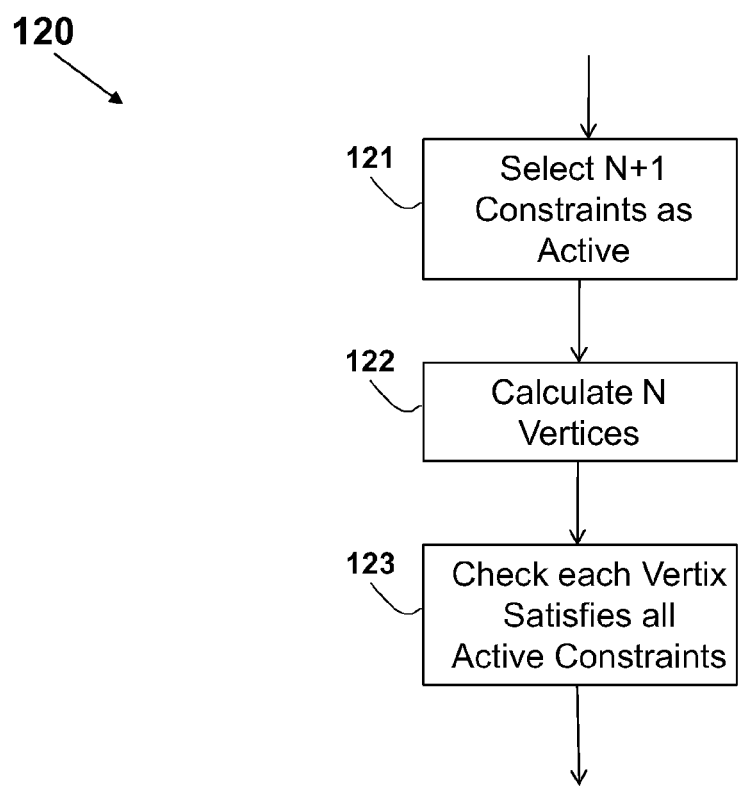
FIG. 12 illustrates schematically a simplified flow chart of part of a method for solving generalized linear programming problems according to one aspect of the invention.

Referring to the flow chart of FIG. 12, in the first step 121 named 'Select N+1 Constraints as active', a subset that includes N+1 constraints is selected from the total set of available constraints, and these constraints are referred to as the active constraints. The selected set may be the first constraints, the last constraints or arbitrarily selected. In the 'Calculate N vertices' step 122, all the permutations of sets of N constraints out from the active constraints, are each used to calculate a vertex where all the inequalities are treated as equalities. As such, N vertices points are obtained. For example, one may assume an example of a set of 3 variables $x_1$, $x_2$ and $x_3$ (N=3), and a set of 6 constraints $C_1$, $C_2$, $C_3$, $C_4$, $C_5$ and $C_6$ (M=5). In this example, 4 constraints will be selected in step 121 such as $C_1$, $C_2$, $C_3$ and $C_4$. In step 122, the 4 vertices P1, P2, P3 and P4 will be calculated, wherein P1 will be the intersection of $C_2$, $C_3$ and $C_4$, P2 will be the intersection of $C_1$, $C_3$ and $C_4$, P3 will be the intersection of $C_1$, $C_2$ and $C_4$, and P4 will be the intersection of $C_1$, $C_2$ and $C_3$. The four vertices P1, P2, P3 and P4 are referred to as the active vertices. In the next step 123 named 'Check each Vertix Statisfies all Active Constraints', all the active vertices are checked versus all the active constraints. Vertices that do not satisfy all the active constraints are deactivated and removed from the IFR. In the example above, P1 is checked to satisfy the C1 (since all other constraints were used to form P1, there is no need to check that P1 satisfies these constraints), P2 is checked to satisfy $C_2$, P3 is checked to satisfy $C_3$, and P4 is checked to satisfy $C_4$. In the case that any point does not satisfy the checked constraint, the point is removed from the list (deactivated). For example, assuming P3 does not satisfy $C_3$, then P3 is deactivated. After completing the flow chart 120, the IFR is defined as the set of active constraints ($C_1$, $C_2$, $C_3$ and $C_4$ in the example) and the set of active vertex points (P1, P2 and P4 in the example). Each point is associated with and defined by the constraints that intersect in that vertex, for example point P2 is associated with constraints $C_1$, $C_3$ and $C_4$ in the above example.

Returning to FIG. 11, the IFR, defined as the active constraints and the active vertices is serving as the initial TFR (Temporary Feasible Region) in 'TFR←IFR' step 111. In the example above, the initial TFR is the IFR defined as the 4 active constraints $C_1$, $C_2$, $C_3$ and $C_4$, and the vertices P1, P2 and P4. The existence of additional constraints is checked in a 'More Constraints?' step 112. In the case wherein all constraints in the set have been considered and there is no other constraint to process, the method is ended in an 'END Last TFR is final' step 113, and the active constraints and active vertices in the TFR defines the polytope of the feasible region. In one example, these vertices are checked in the function to be maximized (or minimized), and the point resulting in the maximum value (or the minimum) is the solution. In the case where there are more constraints to consider, another constraint is marked as active and brought into consideration in a 'Get Next Constraint as active Constraint' step 114. Since handling the newly introduced constraint may be different according to the active TFR being bounded or not, the TFR is checked for being bounded in a 'TFR Bounded?' step 115. In the case where the current TFR is bounded, the TFR is checked versus the newly introduced constraint in an 'Update Bounded TFR' step 116. The 'Update Bounded TFR' step 116 is described in details in flow chart 130 in FIG. 13. In the case that the current TFR is not bounded, the TFR is checked versus the newly introduced constraint in an 'Update Unbounded TFR' step 117. The 'Update Unbounded TFR' step 117 is described in details in flow chart 150 in FIG. 15. The updated TFR is used as a basis for additional constraints (one at a time) in step 112, until all constraints are processed, and the flow is ended in step 113.

One example of a method for determining if a TFR is bounded or unbounded involves analyzing the vertices and the constraints forming these vertices. In a bounded region, each of the vertices points has N connections to other vertices. A connection means changes in only a single constraint. For example, in the case wherein there are two variables $x_1$ and $x_2$ (N=2), each point in a bounded region is connected to two other points. In one example, there are 4 constraints $C_1$, $C_2$, $C_3$ and $C_4$, and 4 vertices: P1 ($C_1$, $C_4$) [meaning that P1 is the intersection of $C_1$ and $C_4$], P2 ($C_1$, $C_2$), P3 ($C_2$, $C_3$) and P4 ($C_3$, $C_4$). This TFR is bounded since P1 is 'connected' to P2 (same $C_1$ in both), and P1 is also 'connected' to P4. Similarly, P2 is 'connected' to P1 and also 'connected' to P3. P3 is 'connected' to P2 and also 'connected' to P4. Similarly, the P4 is 'connected' to P3 and also 'connected' to P1. Hence, all the vertices are each connected to 2 points, thus forming a bounded region. In the case wherein one of the points was not part of the TFR, then the region would be unbounded. For example, if P3 was not part of TFR, then P2 is 'connected' only to P1, thus not satisfying the requirement for two connected points.

In another example wherein N=3 as described above, the TFR includes 4 active points P1 ($C_2$, $C_3$, $C_4$), P2 ($C_1$, $C_3$, $C_4$), P3 ($C_1$, $C_2$, $C_4$) and P4 ($C_1$, $C_2$, $C_3$) formed by 4 active constraints $C_1$, $C_2$, $C_3$ and $C_4$. The defined region is bounded since each point is connected to the other 3 vertices, thus forming a pyramid-like bounded shape. In the case wherein a TFR is found to be bounded, the consideration of additional constraints will always render the region bounded. However, an unbounded TFR may turn after introduction of a new constraint to a bounded region or may stay as unbounded region.

Figure 13:
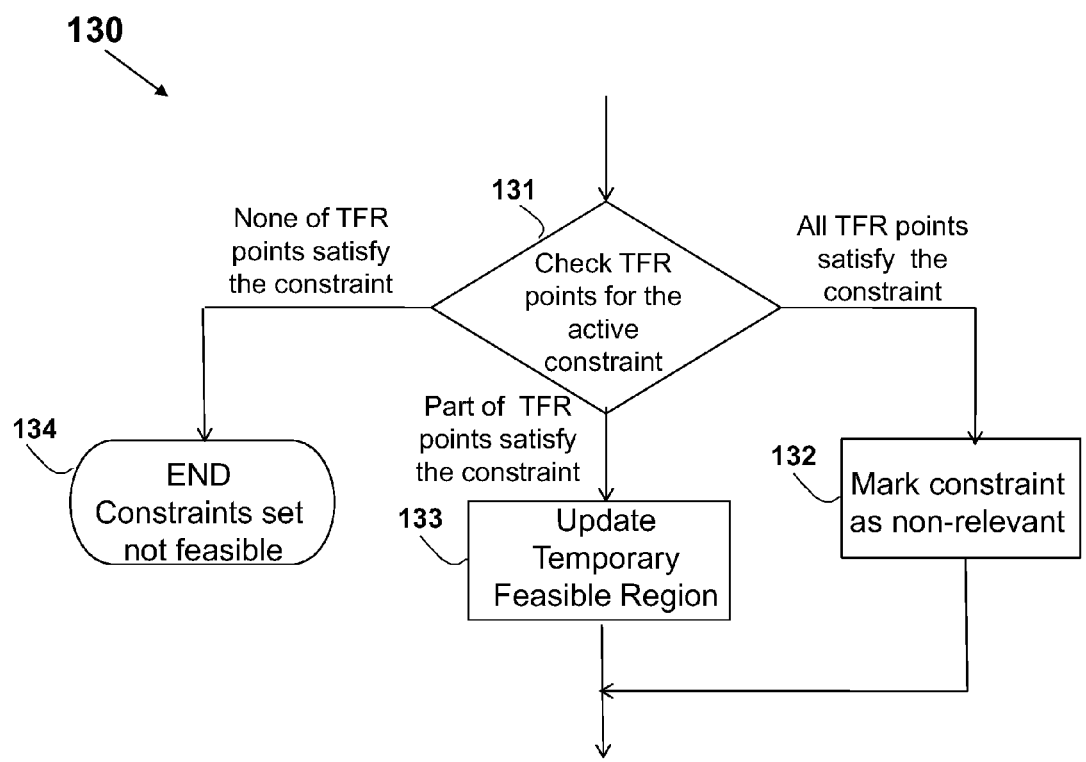
FIG. 13 illustrates schematically a simplified flow chart of part of a method for solving generalized linear programming problems according to one aspect of the invention.

The 'Update Bounded TFR' step 116 is shown in detail in a flow chart 130 shown by FIG. 13. In the 'Check TFR points for the active constraint' step 131 the active vertices of the TFR are checked to satisfy the newly introduced active constraint. In the case that none of the TFR points satisfy the now considered constraint, then the set of the active constraints thus far considered is non-consistent, and no feasible region is defined by these constraints, and thus the algorithm ends as shown in an 'END Constrains set not feasible' step 134. In the case that all of the points defining the TFR satisfy the newly introduced active constraint, the TFR is not changed (and can be used as-is for considering the next constraint) and this constraint is deactivated, as shown in 'Mark constraint as non-relevant' step 132. This is an indication that this constraint does not impact the feasible region, and the same region is defined with or without this constraint. In the case that only part of the TFR points are satisfying the constraint, the TFR is updated, as shown by step 133.

Figure 14:
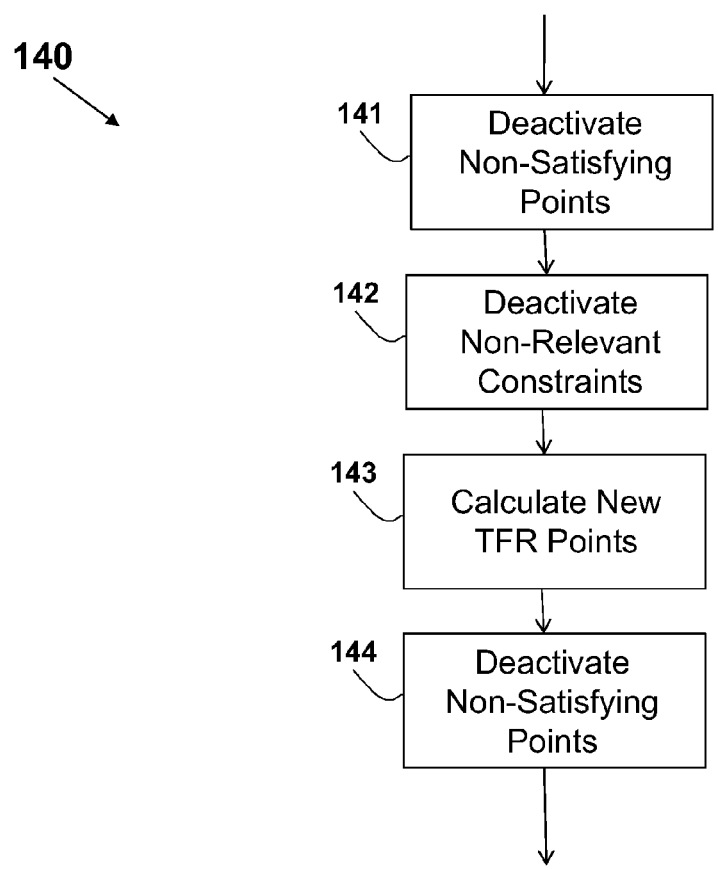
FIG. 14 illustrates schematically a simplified flow chart of part of a method for solving generalized linear programming problems according to one aspect of the invention.

The 'Update TFR' step 133 is shown in detail in a flow chart 140 shown by FIG. 14. First, as shown in a 'deactivate Non-Satisfying Points' step 141 all the current TFR active points are checked to satisfy the newly introduced constraint, and those points which do not satisfy the constraint are deactivated, thus removed from the TFR. In a 'Deactivate Non-Relevant Constraints' step 142 all active constraints are checked to be forming one or more of the active points. In the case that a constraint is not part of any active point, this constraint is deactivated and thus removed from the TFR. In the following 'Calculate New TFR Points' step 143, all of the intersection points of the newly introduced constraint with the active constraints are calculated, by choosing all combinations of N−1 constraints from the existing active constraints set (excluding the new one), with the newly introduced constraint. All the newly generated points are considered active. In a 'Deactivate Non-Satisfying Points' step 144 all of the newly generated points are checked versus all the active constraints, and those points that do not satisfy all of the active constraints are deactivated. The resulting set of the active points and the set of active constraints is the new TFR to be used.

As an example, it is assumed that N=3 and the current TFR consists of 4 active constraints $C_1$, $C_2$, $C_3$ and $C_4$ and 4 active points: P1 ($C_2$, $C_3$, $C_4$), P2 ($C_1$, $C_3$, $C_4$), P3 ($C_1$, $C_2$, $C_4$) and P4 ($C_1$, $C_2$, $C_3$). In step 131, a new constraint $C_5$ is introduced, and only P3 is found not to satisfy the new constraint $C_5$. Hence, in step 141 P3 is deactivated. Since all the constraints C1 to C4 are still represented in the remaining active points, no constraint is removed from the active constraints set of the TFR in step 142. Next, in step 143, new points P5 ($C_1$, $C_2$, $C_5$), P6 ($C_1$, $C_3$, $C_5$), P7 ($C_1$, $C_4$, $C_5$), P8 ($C_2$, $C_3$, $C_5$), P9 ($C_2$, $C_4$, $C_5$) and P10 ($C_3$, $C_4$, $C_5$) are calculated, consisting of all the combinations of $C_5$ with all other active constraints. In step 144, all the new points are checked to satisfy all active constraints. For example, it is assumed that points P5 and P6 do not satisfy $C_4$, and thus are deactivated. Thus, the updated TFR consists of points P1 ($C_2$, $C_3$, $C_4$), P2 ($C_1$, $C_3$, $C_4$), P4 ($C_1$, $C_2$, $C_3$), P7 ($C_1$, $C_4$, $C_5$), P8 ($C_2$, $C_3$, $C_5$), P9 ($C_2$, $C_4$, $C_5$) and P10 ($C_3$, $C_4$, $C_5$), and the active constraints are $C_1$, $C_2$, $C_3$, $C_4$ and $C_5$.

In another example, it is assumed that N=3 and the current TFR consists of 4 active constraints $C_1$, $C_2$, $C_3$ and $C_4$ and 4 active points: P1 ($C_2$, $C_3$, $C_4$), P2 ($C_1$, $C_3$, $C_4$), P3 ($C_1$, $C_2$, $C_4$) and P4 ($C_1$, $C_2$, $C_3$). In step 131, a new constraint $C_5$ is introduced, and P1, P2 and P4 are found not to satisfy the new constraint $C_5$. Hence, in step 141 P1, P2 and P4 are deactivated, leaving only P3 as the active point in the TFR. Since constraint $C_3$ is not represented in the remaining active point, $C_3$ is deactivated in step 142 and removed from the active constraints set of the TFR. Next, in step 143, new points P5 ($C_1$, $C_2$, $C_5$), P6 ($C_1$, $C_4$, $C_5$) and P7 ($C_2$, $C_4$, $C_5$), are calculated, consisting of all the combinations of $C_5$ with all other active constraints. In step 144, all the new points are checked to satisfy all active constraints. For example, it is assumed that points P5 does not satisfy constraint $C_4$, and thus is deactivated. Thus the updated TFR consists of points P3 ($C_1$, $C_2$, $C_4$), P6 ($C_1$, $C_4$, $C_5$) and P7 ($C_2$, $C_4$, C5), and the active constraints are $C_1$, $C_2$, $C_4$ and $C_5$.

Figure 15:
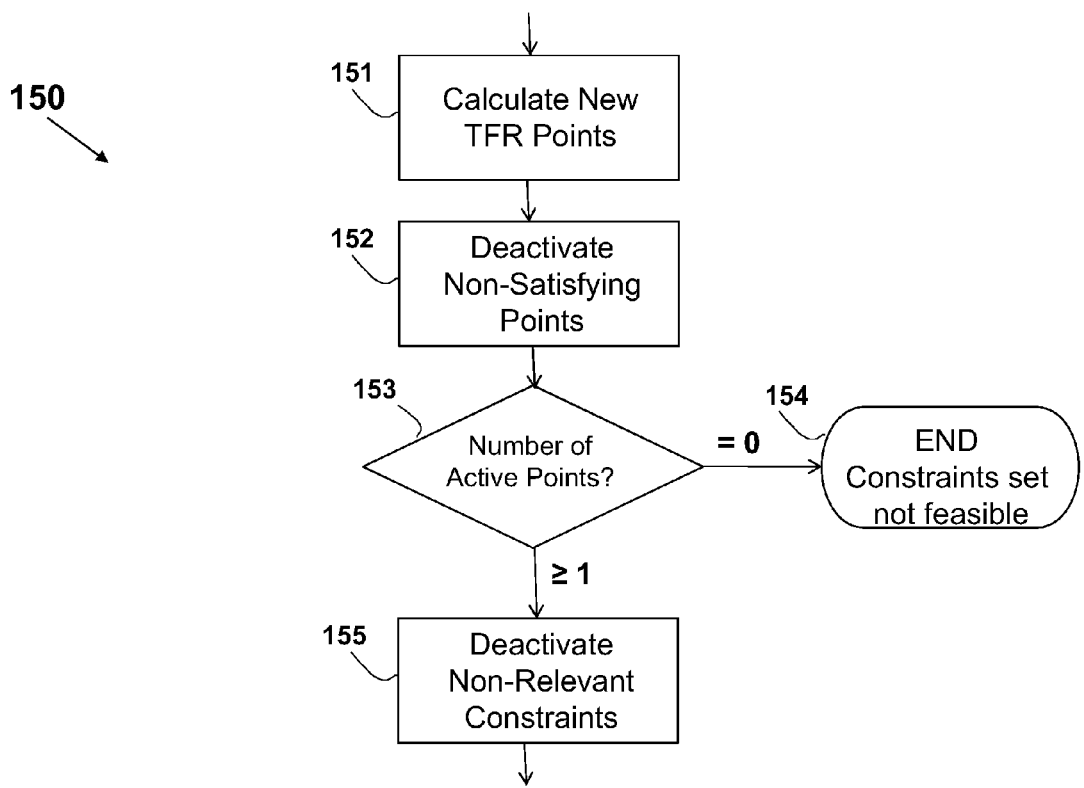
FIG. 15 illustrates schematically a simplified flow chart of part of a method for solving generalized linear programming problems according to one aspect of the invention.

In the case of unbounded TFR, the 'Update Unbounded TFR' step 117 is shown in detail in flow chart 150 in FIG. 15. Similar to step 143 above, the intersection of the newly introduced constraint is calculated to provide additional active points in a 'calculate New TFR Points' step 151. Then in a 'Deactivate on-Satisfying Points' step 152, which is similar to step 144 above, all active points are checked to satisfy all active constraints. Points that do not satisfy one or more of the active constraints set are deactivated. The number of active points is then checked in a 'Number of Active Points?' step 153. In the case wherein no active points are available, since not even a single point was found to satisfy all active constraints, then the process is ended in an 'END Constraints set not feasible' step 154 since there is no feasible region defined by the active constraints, similar to step 134. However, if one or more active points are available, then the active points are checked versus the active constraints, similar to step 142, where the active constraints that are not part of any active point are being deactivated. The updated constraints and points sets form the updated TFR to be used for checking additional constraints (if they exist).

In the case of an objective function, the active points of the final TFR are checked for a minimum (or maximum, as applicable), and the vertex providing the minimum value is the solution of the problem providing a global minimum under the constraints set.

In an alternative approach, the IFR is calculated using only N constraints of the full constraints set. The subset containing these N constraints is used to calculate a single intersection point. This calculated point is considered as an active point and the N constraints are considered as the active constraints of the IFR (which is an unbounded IFR).

One advantage of the method above is the ability to detect that there is no feasible region without considering all the constraints together. A constraint that is not consistent with one or more other constraints (and thus resulting in a non-consistent set) may be detected before all of the constraints are being considered. Further, since a limited number of constraints may be observed as having no feasible solution, the practical analysis of which constraint (or few constraints) is to be further investigated as being problematic and rendering the set infeasible, which may be an advantage in practical engineering problems having a large number of constraints to analyze. Another advantage relates to the fact that the processing involves the inversion of matrices not larger than N×N, thus requiring less complexity and thus less processing power or processing time (i.e., compared to the simplex method requiring inversion of matrices bigger than N×N). Another advantage of the described method is that constraints that have no effect on the feasible region are identified, which may be beneficial in practical engineering problems.

A permutation matrix is a square binary matrix obtained by permuting the rows of an N×N identity matrix according to some permutation of the numbers 1 to N. Every row and column therefore contains precisely a single 1 with 0s everywhere else, and every permutation corresponds to a unique permutation matrix Pk. There are N! different permutation matrices Pk (k=1, . . . K) of size N (K=N!), wherein N! is a factorial. The two permutation matrices 160a and 160b of order two (N=2, 2!=2) are shown in FIG. 16, and the six permutation matrices 161a, 161b, 161c, 161d, 161e and 161f of order three (N=3, 3!=6), respectively designated as $P_1$, $P_2$, $P_3$, $P_4$, $P_5$ and $P_6$, are shown in FIG. 16a.

Figure 17:
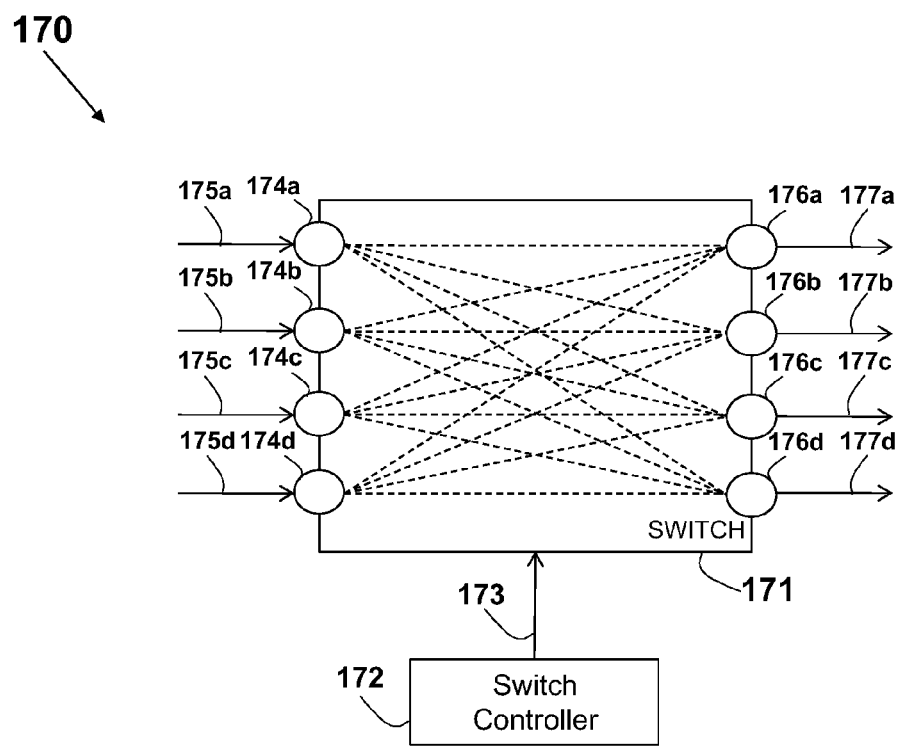
FIG. 17 illustrates schematically a 4×4 switching system according to one aspect of the invention.

Some flow control systems use crossbar switching for routing incoming streams into outgoing streams. An example of a flow control system 170 is shown in FIG. 17, containing a 4×4 switch 171. The switch 171 includes four incoming ports 174a, 174b, 174e and 174d respectively coupled to incoming streams 175a, 175b, 175c and 175d. The switch 171 further comprises four output ports 176a, 176b, 176c and 176d respectively outputting outgoing streams 177a, 177b, 177c and 177d. The switch 171 can be configured into various states, wherein in each state each input port is coupled to a single output port (and each output port is coupled to a single input port), such that during this state an incoming stream in an incoming port is directed to an outgoing stream corresponding to an output port. The possible couplings between the incoming and outgoing ports are shown as dashed lines connecting the ports in FIG. 17. The switch 171 is commanded to be in a state and to shift to another state by the switch controller 172 coupled to switch 171 via the control channel 173.

Figure 18:
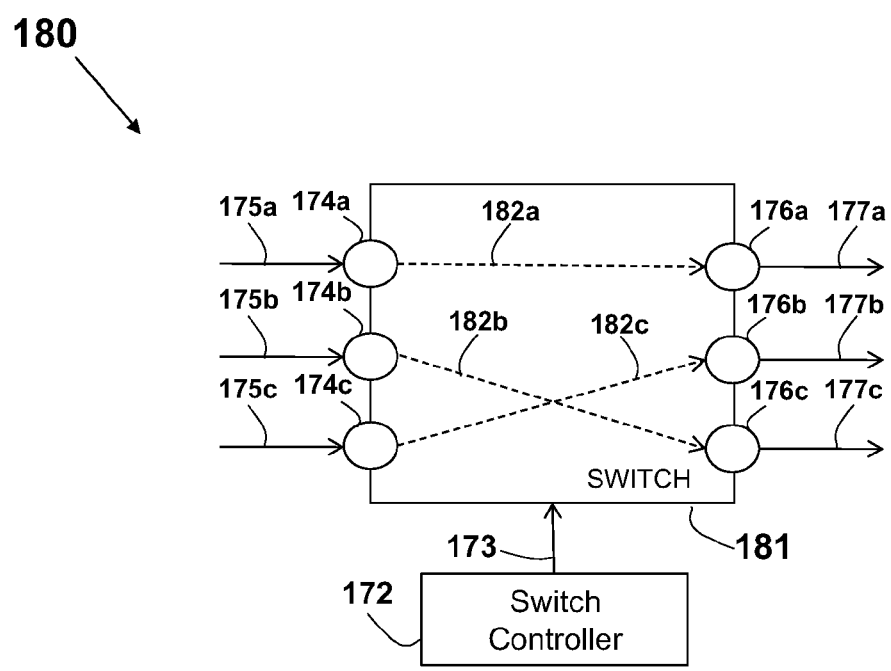
FIGS. 18 and 18a illustrate schematically states of a 3×3 switching system according to one aspect of the invention.
Figure 18A:
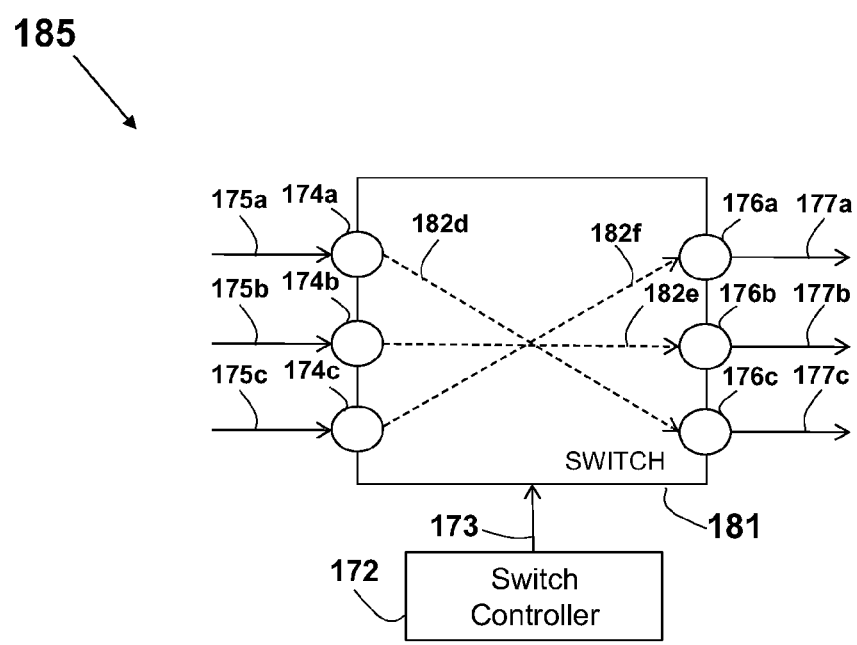

An example of one state of a 3×3 switch 181 is shown in system 180 in FIG. 18. The incoming port 174a is coupled to output port 176a via coupling 182a, thus forwarding incoming stream 175a to the outgoing stream 177a. Similarly, the incoming port 174b is coupled to output port 176c via coupling 182b, thus forwarding incoming stream 175b to the outgoing stream 177c. Similarly, the incoming port 174c is coupled to output port 176b via coupling 182c, thus forwarding incoming stream 175c to the outgoing stream 177b. Another example of a state of a 3×3 switch 181 is shown in system 185 in FIG. 18a. The incoming port 174a is coupled to output port 176c via coupling 182d, thus forwarding incoming stream 175a to the outgoing stream 177c. Similarly, the incoming port 174b is coupled to output port 176b via coupling 182e, thus forwarding incoming stream 175b to the outgoing stream 177b. Similarly, the incoming port 174c is coupled to output port 176a via coupling 182f, thus forwarding incoming stream 175e to the outgoing stream 177a. Commonly input-queued switches are used, such as switch 196 shown as part of switching system 190 in FIG. 19, wherein input buffers 195a, 195b, 195c and 195d are respectively coupled to input ports 174a, 174b, 174c and 174d. The buffers 195a-d may be part of the switch 196 as shown, or can be housed separately external to the switch.

A permutation matrix can be defined by each possible state of a switch. The rows of the matrix correspond to the input ports, while the columns correspond to the output ports. Any '1' in the permutation matrix indicates a connection between the corresponding input port/row and the output port/column. For example, the state of the switch 181 shown in FIG. 18 corresponds to permutation matrix 161d, while the stare of the switch 181 shown in FIG. 18a corresponds to permutation matrix 161f.

The requirements from a switching system may be represented by an N×N arrival rate matrix R, $R=(r_{ij})$, where $r_{ij}$ represents the mean rate of traffic from input i to output j ($r_{ij} \geq 0$), and N is the size of the switch. The matrix R is said to be admissible and doubly sub-stochastic if the sum of each row and each column is equal or less than 1 as shown in the inequalities 201 and 202 in FIG. 20. The matrix R is said to be doubly stochastic if the sum of each row and each column is equal to 1 as shown in the inequalities 203 and 204 in FIG. 20. The traffic profile may be known and static, for example by admission control schemes. Alternatively, the incoming rates are continuously measured affecting a dynamic arrival rate matrix. The latter may use traffic rate sensors connected to each incoming stream, as exampled in switching system 190 in FIG. 19, employing traffic-rate and traffic target sensors 193a, 193b, 193c and 193d respectively metering the incoming traffic streams 175a, 175b, 175c and 175d entering the respective input ports 174a, 174b, 174e and 174d, and thus creating a matrix R relating to the current or recent switching requirements.

Hence, in the operation of a switching system an algorithm is required to determine which states (each represented by a permutation matrix $P_k$) to use, the order of introducing the various states and the length of the time-slot of using each state (respectively represented by the 'weight' $\phi_k$), in order to meet the traffic rate as per inequality 205. Various algorithms have been proposed in the prior art to calculate. The criterion for choosing the proper algorithm to use may include, for example, a minimum number of states to use, minimum bandwidth (BR), minimum buffer overflows, minimum jitter, minimum complexity (such as on-line computational and memory complexities) and minimum buffers depth. Further, 100% throughput, guaranteed rates for each input-output pair and minimum (or no) internal speedup may also be required. A combination of one or more criteria may also be used. One example in the case of frame scheduling that is based on Birkhoff Von-Neumann (BV) decomposition wherein the rate matrix R is doubly sub-stochastic of doubly stochastic, it was shown that $K \leq N^2 - 2N + 2$, as disclosed in U.S. Patent application 2007/0280261 to Szymanski entitled: "Method and apparatus to schedule packets through a crossbar switch with delay guarantees".

Some examples of prior-art publications relating to switch scheduling or control are U.S. Patent application 2007/0280261 to Szymanski entitled: "Method and apparatus to schedule packets through crossbar switch with delay guarantees", U.S. Pat. No. 7,359,384 to Kodialam et al. entitled: "Scheduling of guaranteed-bandwidth low-jitter traffic in input-buffered switches", U.S. Patent application 2006/0165070 to Hall et al. entitled: "Packet switching", which are all incorporated in their entirety for all purposes as if fully set forth herein. Other prior art publications include the following publications, which are all incorporated in their entirety for all purposes as if fully set forth herein:

(a) C. S Chang, W. J. Chen, H. Y Huang, "On Service Guarantees for Input Buffered Crossbar Switches: A capacity Decomposition approach by Birkhoff and von Neumann", Proc. iWQoS Conf., 1999, pp. 79-86, IEEE, USA.

(b) I. Keslassy, M. Modialam, T. V Lakshamn, D. Stiliadis, "On Guaranteed Smooth Scheduling for Input-Queued Switches", IEEE/ACM Trans. Networking, December 2005, pp. 1364-1375, Vol. 13, No. 6, IEEE, USA.

(c) Z. Liu, X. Zhang, Y. Zhao, R. Wang, "A performance Analysis Framework for Routing Lookup in Scalable Routers", Proceedings of the 23rd international conference on Information Networking, Chiang Mai, Thailand, pp. 225-229, 2009, ISBN: 978-1-4244-4526-4.

(d) S. Mohanty, L. N. Bhuyan, "Guaranteed Smooth Switch Scheduling with Low Complexity", Proc. Globecom Conf. 2005, pp. 626-630, IEEE, USA.

(e) B. Lin, "A simple Rate Quantization Method for Service Guaranteed with Input-Queued Switches", pp. 144-153.

(f) J. Li, N. Ansari, "Enhanced Birkhoff-von Neumann decomposition algorithm for input queued switches", IEE Proc. Commun., Vol. 148, No. 6, December 2001, pp. 339-342.

(g) W. J. Chen, C. S. Chang, "Birkhoff-von Neumann Input Buffered Crossbar Switches", Proc. Infocom Conf. 2000, pp. 1614-1623, IEEE, USA.

(h) J. D. Carpinelli, Y. Oruc, "A Nonbacktracking Matrix Decomposition Algorithm for Routing on Clos Networks", IEEE Trans. Commun. August 1993, pp. 1245-1251, Vol. 41, No. 8, IEEE USA.

(i) T. H. Szymanski, "A Low-Jitter Guaranteed-Rate Scheduling Algorithm for Packet-based IP Routers", IEEE Trans. On Communication, Vol. 57, No. 11, November 2009, pp. 3446-3459, IEEE USA.

(j) J. S. Turner, R. Melen, "Multirate Clos Networks", IEEE Comm. Mag., October 2003.

(k) V. Anantharam, N. Mckown, J. Walrand, "Achieving 100% Throughput in an Input-Queued switch", IEEE Trans. Communication, August 1999, PG. 1260-1267, Vol. 47, No. 8, USA.

(l) T. Weller, B. Hajek, "Scheduling Nonuniform Traffic in a Packet-Switching System with Small Propagation Delay", IEEE/ACM Trans. on Networking, December 1997, pp. 813-823, Vol. 5 No. 6, IEEE USA.

(m) A. Hung, G. Kesidis, N. MCckown, "ATM Buffered Switches with the Guaranteed Rate Property", Proc. Symp. Comput. And Commun. (ISCC) Conf., 1998, pp. 331-335, IEEE USA.

(n) C. E. Koksal, R. G. Gallager, C. E. Rohrs, "Rate Quantization and Service Quality over Single Crossbar Switches", Infocom Conf., 2004, pp. 1962-1973, IEEE USA.

Figure 19:
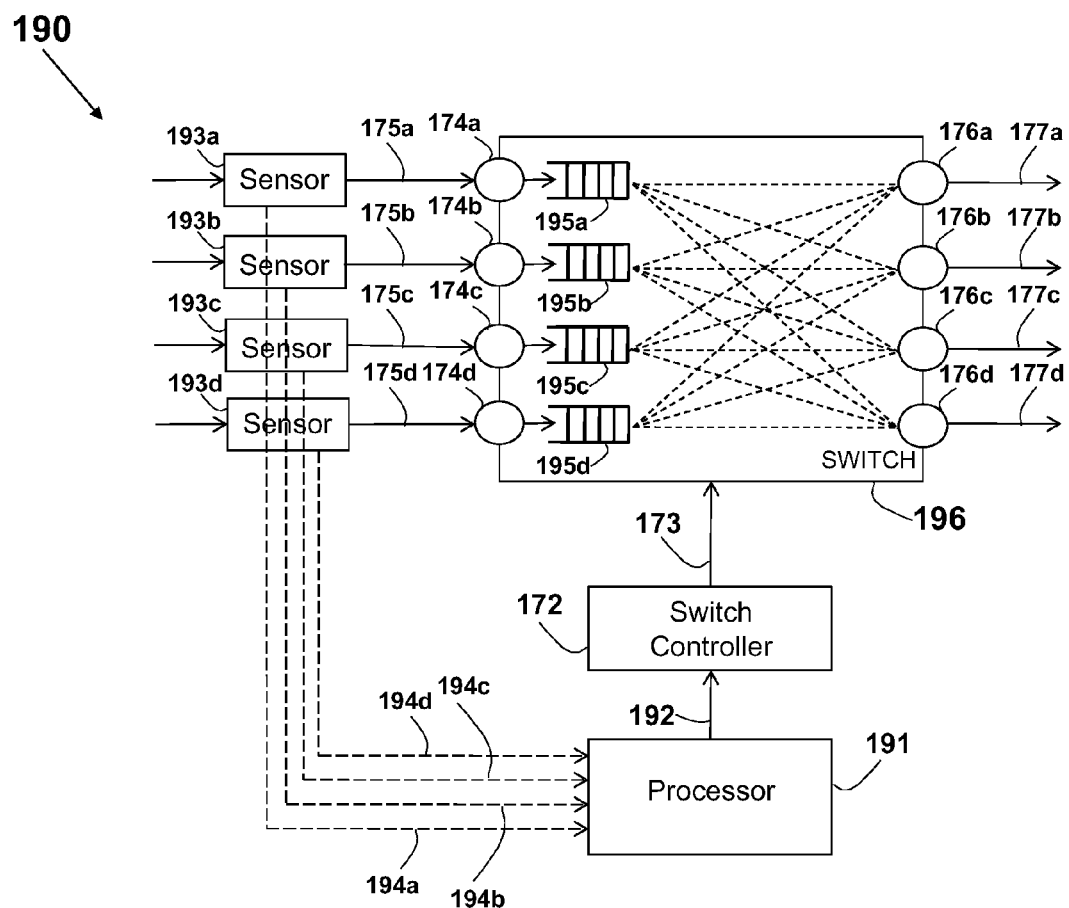
FIGS. 19 and 19a illustrate schematically a 4×4 switching system according to one aspect of the invention.
Figure 19A:
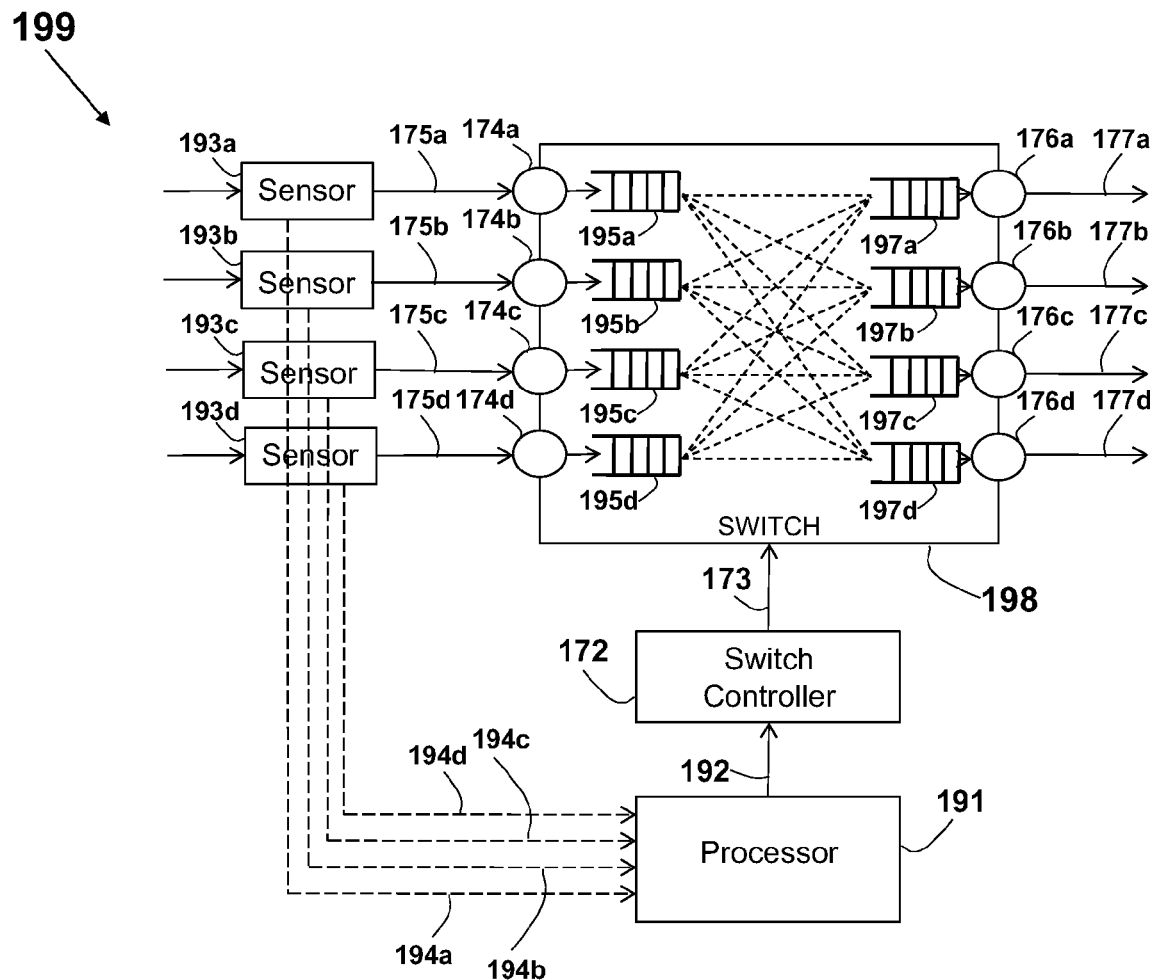

An example of a 4×4 switching system 190 is shown in FIG. 19. The incoming streams 175a, 175b, 175e and 175d are respectively coupled to the switch 196 input ports 174a, 174b, 174c and 174d via traffic rate sensors 193a, 193b, 193c and 193d. The rate sensors are respectively coupled to the processor 191 inputs via connections 194a, 194b, 194c and 194d. The processor 191 uses the sensed traffic rates according to an algorithm (commonly implemented by software) to determine the optimal states and their sequence, and accordingly send the proper commands to the switch controller 172 via connection 192. In the system 190 the time is slotted and synchronized so that flow (e.g., data packets) from different input buffers can be read out simultaneously within a time slot. The switch controller 172 in turn sets the switch 196 in each time slot into the required states via the control connection 173, thus setting up the required connection pattern according to a permutation matrix. As the permutation matrix is a one-to-one mapping from input ports to output ports, flow destined to the same output ports cannot be transmitted in the same time. The scheduling scheme may be optimized for high throughput and controlled flow delay. Another example a 4×4 switching system 199 is shown in FIG. 19a, wherein the switch 198 further including output buffers 197a, 197b, 197c and 197d respectively connected to the output ports 176a, 176b, 176c and 176d. While a 4×4 switch has been exampled in FIG. 19, it will be appreciated that other embodiments equally apply including any number of input/output ports. Further, while the embodiments have been exampled above with regard to a switching system having the same number of inputs and outputs, it will be appreciated that other embodiments equally apply, where different numbers are used for input and output ports.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware corresponding to the processor.

As used herein, the terms "program", "programmable", and "computer program" are meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like, as well as in firmware or other implementations.

In operation, the switch sequentially shifts between states in order to best accommodate the required switching as represented by the traffic-rate matrix R. In the case of static requirements, the switch states are configured to be re-used in a sequence of time-slots. In a dynamic system, the states sequence may be updated in order to best accommodate the current traffic requirements. Since the switch states can be represented as permutation matrices, the switch states sequence can be represented as a convex combination of permutation matrices. The switching requirement may thus be formulated as inequality 205 in FIG. 20, wherein the decomposition of the rate matrix R generates a set of permutation matrices $P_k$, k=1, . . . , K (each corresponding to a switch state), and where each $\phi_k$ ($\phi_k \geq 0$) is a constant equal to the 'weight' of permutation matrix $P_k$ (e.g., the length of the time slot corresponds to this switch state). Equation 205a in FIG. 20 gives the relation between the elements R(i,j) [$=r_{ij}$] of the traffic rate matrix and elements $P_k$(i,j) of the K permutation matrices. The bandwidth requirement BR of the traffic scheduling is given by equation 206 in FIG. 20, where M≤1 is the largest of the row sums and columns sum of the rate matrix R.

An expanded expression 210 of the inequality 205 examined in 3×3 switching system is shown in FIG. 21. Similarly, an expanded expression 211 of the traffic-rate matrix R in 3×3 switching system is shown in FIG. 21a. The expression 210 includes nine inequalities, relating to each element of the rate matrix R, namely: (1) $r_{11} \leq \phi_1 + \phi_4$ (2) $r_{12} \leq \phi_2 + \phi_5$ (3) $r_{13} \leq \phi_3 + \phi_6$ (4) $r_{21} \leq \phi_3 + \phi_5$ (5) $r_{22} \leq \phi_1 + \phi_6$ (6) $r_{23} \leq \phi_2 + \phi_4$ (7) $r_{31} \leq \phi_2 + \phi_6$ (8) $r_{32} \leq \phi_3 + \phi_4$ (9) $r_{33} \leq \phi_1 + \phi_5$. The expression 210 as well as the 9 inequalities above may be formulated as the expression 220 shown in FIGS. 22 and 22a, wherein the rate matrix elements $r_{ij}$ are lined up to form the vector R' 221a shown transposed as vector 221 in FIG. 22 and containing 3*3=9 elements, the corresponding fractions of time $\phi_k$ (k=1, . . . , 6) are lines up to form the vector $\phi$ 222a (used as transposed vector 220 in FIG. 22), and the matrix Q 223 is formed such that $\phi^t Q \leq R^{'t}$ shown as expression 220. The matrix Q 223 has 6 rows (as the number of permutation matrices) and 9 columns (as the number of permutation matrix elements). It should be noted that each row of the matrix Q 223 has exactly three '1's and all other '0's, and that each column have exactly two '1's and all other '0's. In the generic N×N case shown in FIG. 23, the R' vector 231 includes the $N^2$ elements of the rate matrix R, lined up according to their rows (or similarly according to columns), the $\phi$ vector 232 includes the M defined weights of the respective M permutation matrices, where M is maximum N!, but may be lower such as $M \leq N^2 - 2N + 2$ example is the case of frame scheduling that is based on Birkhoff Von-Neumann (BV) decomposition wherein the rate matrix R is doubly sub-stochastic of double stochastic, as disclosed in U.S. Patent application 2007/0280261 to Szymanski entitled: "Method and apparatus to schedule packets through crossbar switch with delay guarantees". The matrix 233 includes '1's and '0's corresponding to the permutation matrices location of '1's.

In one example, each of the corresponding fractions of time $\phi_k$ is required to be equal or less than 1 ($\phi_k \leq 1$) (such that for any k $0 \leq \phi_k \leq 1$ applies for any k), thus avoiding the need to up-speed the system in order to meet the requirements. In one example, the sum of the $\phi_k$ is required to be equal to 1, as shown in equation 207 in FIG. 20. In some switching system, the target is to optimize the system for a minimum of the $\phi_k$'s sum, such that the target function is to minimize the sum $\phi_1 + \phi_2 + \ldots + \phi_K$.

In one aspect of the invention, the constraints set examined for a 3×3 switching system in FIGS. 21a and 22 are analyzed according to the method described above (such as in FIGS. 11-15). For example, feasibility and active constraints may be determined. In one example, the added requirements for $\phi_k$ such as $0 \leq \phi_k$ or $\phi_k \leq 1$ (or both $0 \leq \phi_k \leq 1$) for any k are added as additional constraints. The method is executed as a program being part of the software (or firmware) stored in a memory and executed by the processor 191. The method outputs are used to schedule and set the various states of the switch 196 via the switch controller 172 as described above.

In one example the target of the calculation of the time slots allocation $\phi_k$ is to minimize the sum $\phi_1 + \phi_2 + \ldots + \phi_K$. The switching problem can thus be formulated as minimizing the sum $\phi_1 + \phi_2 + \ldots + \phi_K$ subject to the constraints $\phi^t Q \leq R^{'t}$ shown above. This is equivalent to the standard minimum linear programming problem disclosed above, having the format of minimizing $y^t b$ subject to the constraints $y^t A \geq c^t$ and $y \geq 0$, where the y vector is the $\phi$ vector 232, the A matrix is the Q matrix 233, the c vector is the R' vector 231, and the b vector is a vector containing only '1's. Hence, any linear programming solving method and any linear programming solver may apply to solving this switching problem, such as the simplex algorithm.

The method and system described may be applied to any switch connecting multiple inputs to multiple outputs in a matrix manner. Commonly such switch is an assembly of individual switches arranged in a matrix connecting the multiple inputs to the multiple outputs. In the case of M inputs and N outputs, there are M×N cross-points, with a switch in each cross-point, such that when the switch is closed, it connects one of the M inputs to one of the N outputs. The switch may be a non-blocking switch (such as single layer) or blocking switch, and may use multiple layers.

In one embodiment, the switch is used for digital data networking, as part of a LAN (Local Area Network), WAN (Wide Area Network), MAN (Metropolitan Area Network), or the Internet (e.g., part of the Internet backbone). Such switches handle data at the OSI data link layer (layer 2) and/or at the network layer (layer 3) or above. The latter devices are commonly referred to as routers. In such a system the incoming data flows 175a-d are carrying various digital data communication stream using TDM (Time Division Multiplexing), where a different time interval is allocated for each data stream. Each data stream is segmented into packets (e.g., in packet switching), frames or cells (e.g., in ATM—Asynchronous Transfer Mode). Common packet switching systems (e.g., in the Internet) are based on IP—Internet Protocol. In one example, the switch serves as a 'core' router serving in the Internet backbone, and may use Border Gateway Protocol (BGP) as per RFC 4098 or Multi-Protocol Label Switching (MPLS). The Internet Protocol Suite (TCP/IP) may also be used.

In one embodiment, a conductive or wired medium is used for carrying the incoming traffic streams 175a-d. The wired medium is a wired communication medium, connected to the respective ports 174a-d and containing connectors. Similarly, the outgoing ports 176a-d may include connectors connecting to the conductive or wired medium used for carrying the outgoing respective streams 177a-d. Such a wired medium may be a UTP, STP, coaxial cable, a telephone wire pair, a CATV coaxial cable, AC power wire pair and LAN cable, such as Category 5 or Category 6. A suitable connector may be used for connecting to the specific type of the wired medium, such as a coaxial connector for connecting to a coaxial cable and a telephone connector for connecting to a telephone wire pair. The wired medium may be a single non-used twisted-pair in a LAN cable, or two such pairs connected in parallel. In another aspect of the present invention, the wired medium is using a phantom channel formed between two wire pairs, such as two twisted wire pairs in a LAN cable used in Ethernet 10BaseT, 100BaseTX or 1000BaseT as per IEEE802.3 standard. Similarly, any PAN, LAN, MAN or WAN wiring may be used as the wired medium.

In another embodiment a non-conductive network medium is used, such as a fiber optic cable. In such a case, the digital data (the incoming digital data, the outgoing digital data or both) is carried over fiber optic cable, and the respective ports include fiber optic connectors. As such, the term 'wiring' and 'cable' herein should be interpreted to include networks based on non-conductive medium such as fiber-optic cabling.

All publications, patents, and patent applications cited in this specification are herein incorporated by reference as if each individual publication, patent, or patent application were specifically and individually indicated to be incorporated by reference and set forth in its entirety herein.

Throughout the description and claims of this specification, the word "comprise' and variations of that word such as "comprises" and "comprising", are not intended to exclude other additives, components, integers or steps.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

As will be appreciated by those of skill in the art, the methods described above generally reside on one or more general purpose computing devices which operate under the control of computer executable instructions. The general purpose computing device need not be limited to computers and servers but may include handheld devices, multiprocessor systems, microprocessor-based or programmable customer electronics, minicomputers, mainframe computers, and the like. Furthermore, the computer executable instructions may include routines, programs, objects, components, and/or data structures that perform particular tasks or implement particular abstract data type. Within the network, the computer executable instructions may reside on a single general purpose computing device or the tasks performed by the computer executable instructions may be distributed among a plurality of the general purpose computing devices, which may be linked through a communication network. In a distributed computing environment, program modules may be located in local and/or remote computer storage media including memory storage devices.

Figure 24:
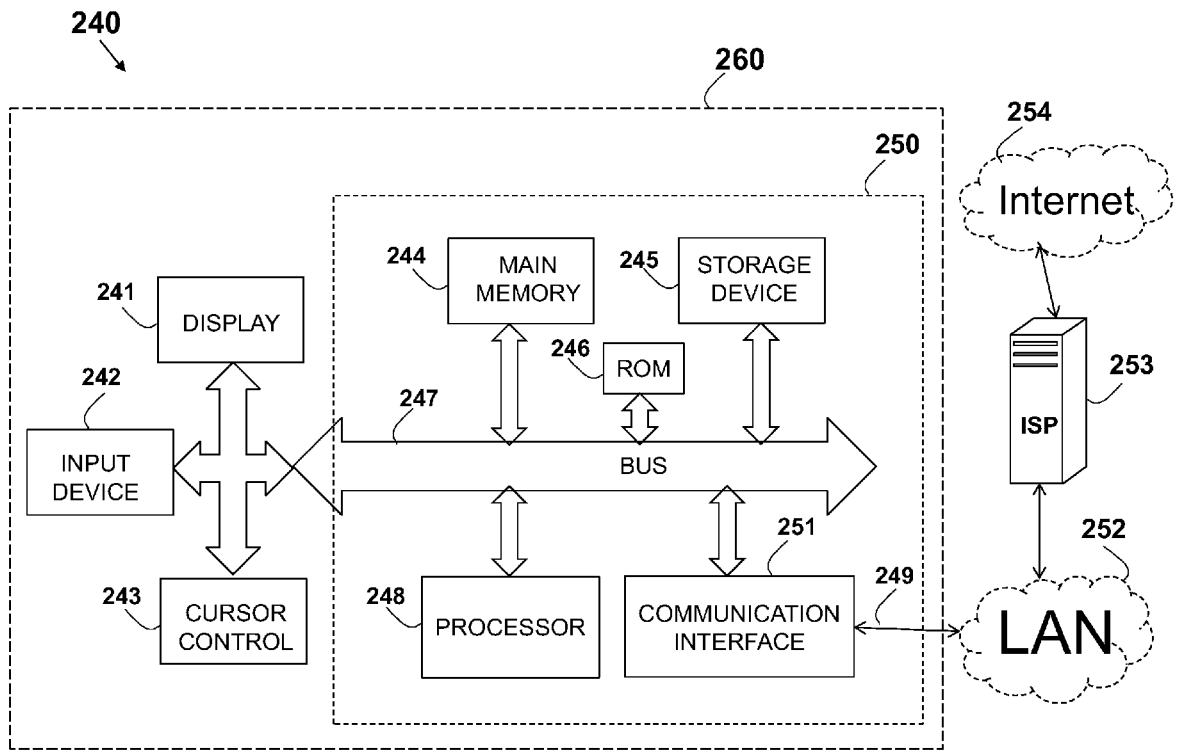
FIG. 24 illustrates schematically a computer system environment having a general computer system connected to the Internet in which the method may be implemented.

FIG. 24 is a block diagram that illustrates the environment of a computing system 240 including a general purpose computing device in the form of computer system 260 (comprising a sub-system 250) and the corresponding Internet 254 connection, upon which an embodiment of the invention may be implemented. Such configuration is typically used for computers (hosts) connected to the Internet 254 and executing a server or a client (or a combination) software. A computer such as a personal computer, server computer, handheld or laptop device, desktop computer, tablet device, microprocessor system, multiprocessor system, set top box, programmable electronics, network PC, minicomputer, mainframe computer, distributed computer environment, as well as any other computer or processor, may use the computer system configuration shown in FIG. 24. Computer system 260 includes (commonly in a separated housing 250) a bus 247 or other communication mechanism for communicating information, and a processor 248, commonly in the form of an integrated circuit, coupled with bus 247 for processing information and for executing the computer executable instructions. The system bus 247 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The computer 260 typically includes a variety of computer-readable media. Computer-readable media can be any available media that can be accessed by the computer 260 and includes both volatile and nonvolatile media and removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 260.

Computer system 260 may include a main memory 244, such as a Random Access Memory (RAM) or other dynamic storage device, coupled to bus 247 for storing information and instructions to be executed by processor 138. Main memory 134 also may be used for storing temporary variables or other intermediate information during execution of instructions to be executed by processor 248. Computer system 260 further includes a Read Only Memory (ROM) 246 or other static storage device coupled to bus 247 for storing static information and instructions for processor 248. A basic input/output system (BIOS), containing the basic routines that help to transfer information between elements within the computer 260, such as during start-up, is typically stored in ROM 246. The main memory 244 typically contains data and/or program modules that are immediately accessible to and/or presently being operated on by the processing unit 138. By way of example, and not limitation, the main memory 244 may contain the operating system, application programs, other program modules and program data.

The computer 260 may also include other removable/non-removable, volatile/nonvolatile computer storage device 245. By way of example only, the computer 260 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage device 245 is typically connected to the system bus 247 through a non-removable memory interface. The storage device 245, such as a magnetic disk or optical disk, a hard disk drive for reading from and writing to a hard disk, a magnetic disk drive for reading from and writing to a magnetic disk, and/or an optical disk drive for reading from and writing to a removable optical disk, is coupled to bus 247 for storing information and instructions. The hard disk drive, magnetic disk drive, and optical disk drive may be connected to the system bus by a hard disk drive interface, a magnetic disk drive interface, and an optical disk drive interface, respectively. The drives and their corresponding computer-readable media provide non-volatile storage of computer readable instructions, data structures, program modules and other data for the general purpose computing devices.

Computer sub-system 250 may be coupled via bus 247 to a display 241, such as a Cathode Ray Tube (CRT), a Liquid Crystal Display (LCD), a flat screen monitor, a touch screen monitor or similar means for displaying textual and graphical data to a user. The display may be connected via a video adapter for supporting the display. The display allows a user to view, enter, and/or edit information that is relevant to the operation of the system, and may be integrated with a touch-screen panel or the like. An input device 242, including alphanumeric and other keys, is coupled to bus 247 for communicating information and command selections to processor 248. Another type of user input device is cursor control 243, such as a mouse, a trackball, a touch pad, or cursor direction keys for communicating direction information and command selections to processor 248 and for controlling cursor movement on display 241. This input device typically has two degrees of freedom in two axes, a first axis (e.g., 'x') and a second axis (e.g., 'y'), that allows the device to specify positions in a plane. Other input devices may include a joystick, game pad, satellite dish, scanner, or the like.

The invention is related to the use of computer system 260 for implementing the methods and techniques described herein. According to one embodiment of the invention, those methods and techniques are performed by computer system 260 in response to processor 248 executing one or more sequences of one or more instructions contained in main memory 244. Such instructions may be read into main memory 244 from another computer-readable medium, such as storage device 245. Execution of the sequences of instructions contained in main memory 244 causes processor 248 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 248 for execution. Such a medium may take many forms, including but not limited to, non-volatile media, volatile media, and transmission media. Non-volatile media includes, for example, optical or magnetic disks, such as storage device 245. Volatile media includes dynamic memory, such as main memory 244. Transmission media includes coaxial cables, copper wire and fiber optics, including the wires that comprise bus 247. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Computer sub-system 250 also includes a communication interface 251 coupled to bus 247. Communication interface 251 provides a two-way data communication coupling to a network link 249 that is connected to a local network 252. For example, communication interface 251 may be an Integrated Services Digital Network (ISDN) card or a modem to provide a data communication connection to a corresponding type of telephone line. As another example, communication interface 251 may be a Local Area Network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba). In such a case, the communication interface 251 typically include a LAN transceiver or a modem, such as Standard Microsystems Corporation (SMSC) LAN91C111 10/100 Ethernet transceiver available from Standard Microsystems Corporation (SMSC) as "LAN91C111 10/100 Non-PCI Ethernet Single Chip MAC+PHY".

Wireless links may also be implemented. In any such implementation, communication interface 241 sends and receives electrical, electromagnetic or optical signals that carry digital data streams representing various types of information.

Network link 249 typically provides data communication through one or more networks to other data devices. For example, network link 249 may provide a connection through local network 252 to a host computer or to data equipment operated by an Internet Service Provider (ISP) 253. ISP 253 in turn provides data communication services through the world wide packet data communication network Internet 254. Local network 252 and Internet 254 both use electrical, electromagnetic or optical signals that carry digital data streams. The signals through the various networks and the signals on network link 249 and through communication interface 251, which carry the digital data to and from computer system 260, are exemplary forms of carrier waves transporting the information.

A received code may be executed by processor 248 as it is received, and/or stored in storage device 245, or other non-volatile storage for later execution. In this manner, computer system 260 may obtain application code in the form of a carrier wave.

Figure 25:
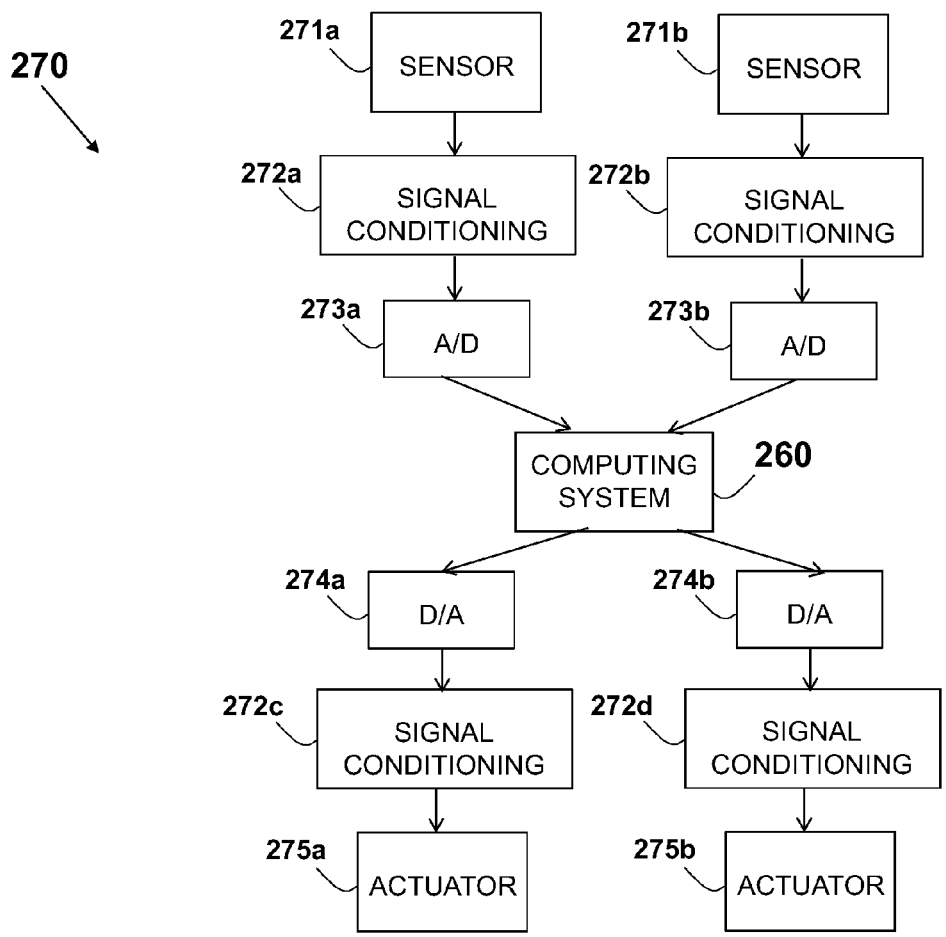
FIG. 25 illustrates schematically a control system according to one aspect of the invention.

In one example, the method is used in a control system where the system models, monitors, or regulates a physical system. An example of such control system 270 is shown in FIG. 25. An analog sensor 271a having an analog electrical output (current or voltage) which responds to, represents or measure a physical, chemical, or biological stimulus or phenomenon, such as a sensor responsive to temperature, humidity, pressure, audio, vibration, light, motion, sound, proximity, flow rate, electrical voltage, and electrical current. For example, the sensor 271a may be a thermistor or a platinum resistance temperature detector, a light sensor, a pH probe, a microphone for audio receiving, a piezoelectric bridge, a photocell, voltage or current detectors, a pressure detector, a motion detector, and manually or automatically operated switches. The sensor 271a provides an output in response to a physical. The sensor output may be amplified by an amplifier. Other signal conditioning may also be applied by the signal conditioning circuit 272a in order to improve the handling of the sensor output, such as attenuation, delay, filtering, amplifying, digitizing and any other signal manipulation.

In the case of an analog sensor 271a having an analog output, an Analog-to-Digital (A/D) converter 273a which converts continuous signals to discrete digital numbers is used, coupled between the analog sensor 271a and the computer 260. The signal conditioning circuit 272a and the A/D Converter 273a may each be integrated with or in the analog sensor 271a, integrated with or in the computing system 260, or provided as separated devices. In the case the sensor is a digital sensor having digital output, the sensor may be coupled to the computing system 260 directly or via a communication link, thus obviating the need for the signal conditioning 272a and the A/D converter 273a.

One, two, or more sensors may be used. The sensors may be identical, similar or different from each other. For example, some sensors may be analog while others may be digital sensors. In another example, different sensors may respond to different physical phenomena. The system 270 is shown to employ two sensors, wherein the second analog sensor 271b is coupled to a signal conditioning 272b, which is coupled to the computing system 260 via the A/D converter 273b.

The data received from the sensors may be used as input to the method described herein. For example, one or more of the parameters or coefficients of one or more of constraints out of the constraints set, (relating to the components of the matrix A and vector b), may be calculated based on the data received from one or more coupled sensor. Similarly, one or more of the parameters or coefficients of the objective function to be maximized/minimized (relating to the components of the vector c), may be calculated based on the data received from one or more coupled sensor. For example, one of the sensors is a temperature sensor, and '$a_{1,1}$' corresponds to the measured temperature, while another coupled sensor is a vibration sensor, and similarly '$b_2$' corresponds to the measured vibration level. Other coefficients or parameters may be fixed or input from other sources. For example, the user may define some of the parameters or coefficients of the problems.

As shown in FIG. 25, the control system 270 may include one or more actuators or transducers. An analog actuator such as an actuator 275a produces a physical, chemical, or biological action, stimulation or phenomenon, such as a changing or generating temperature, humidity, pressure, audio, vibration, light, motion, sound, proximity, flow rate, electrical voltage, and electrical current, in response to the electrical input (current or voltage). For example, an actuator may provide visual or audible signaling, or physical movement. An actuator may include motors, winches, fans, reciprocating elements, extending or retracting, and energy conversion elements, as well as a heater or a cooler. In the case of an analog actuator having an analog input, a Digital-to-Analog (D/A) converter 274a, that converts a digital (usually binary) code to an analog signal (current, voltage or electric charge), is coupled between the computing system 260 and the actuator 275a. A signal conditioning circuit 272c may be used to adapt between the D/A converter 274a output and the analog actuator 275a input. In the case the actuator is a digital actuator having a digital input, the actuator may be coupled to the computing system 260 directly or via a communication link, thus obviating the need for the signal conditioning 272c and the D/A converter 274a.

One, two, or more actuators may be used. The actuators may be identical, similar or different from each other. For example, some actuators may be analog while others are digital sensors. In another example, different actuators may relate to different physical phenomena. The system 270 is shown to employ two actuators, wherein the second analog actuator 275b is coupled to a signal conditioning 272d, which is coupled to the computing system 260 via the D/A converter 274b.

The solution of the problem using the method described herein may be used as input to the actuators. For example, one or more of the actuators may be controlled by the solution for the variables to be (relating to the components of the vector x). For example, one of the actuators is a heater, and '$x_1$' corresponds to the amount of heating required, while another coupled actuator is a motor, and similarly '$x_2$' corresponds to the rotation speed required.

In one aspect the method is used as a service as part of cloud computing services such as Cloud Software as a Service (SaaS), Cloud Platform as a Service (PaaS) or Cloud Infrastructure as a Service (IaaS). The server providing the service may be based on computer 260 described above, providing services of solving the LP problem to clients via the Internet. The LP problem parameters, such as matrix A and vectors b and c, in whole or in part, are sent to the cloud server, and the solution is sent back to the client computer (which may be based on computer 260 described above as well). An example of securely outsourcing the LP problem as a service in cloud computing is described in the can be found in the publication by Cong Wang, Kui Ren, and Jia Wang of the Department of Electrical and Computer Engineering, Illinois institute of Technology, named: "Secure and Practical Outsourcing of Linear Programming in Cloud Computing", which is incorporated in its entirety for all purposes as if fully set forth herein.

In one aspect the method is used for solving microeconomics and company management problems such as engineering, planning, production, transportation, technology, including capital budgeting, warehouse location, covering and packing, scheduling and other known problems commonly handled using LP. The method may further apply to linear integer programming, such as for the problems described in a document by T. S. Ferguson named "Linear Programming—A Concise Introduction", and Bradley, Hax, and Magnanti book, MIT, "Applied Mathematical Programming" Chapter 9, Addison-Wesley, 1977, both incorporated in their entirety for all purposes as if fully set forth herein. The method may further be used for assigning a plurality of input/output objects of a circuit design to banks of programmable integrated circuits (IC), as described in U.S. Pat. No. 8,010,924 to Slonim et al. entitled: "Assignment of Select Input/Output Blocks to Banks for Integrated Circuits using Integer Linear Programming with Proximity Optimization", which is incorporated in its entirety for all purposes as if fully set forth herein.

In one aspect the method is used for solving the problem of network flow such as scheduling data transfer using graphs between nodes in a network such as a communication network, as described in U.S. Pat. No. 7,489,638 to Keslassy et al. entitled: "Scheduling with Delayed Graphs for Communication Networks", which is incorporated in its entirety for all purposes as if fully set forth herein. In one aspect the method is used for solving the problem of planning a supply chain, as described in U.S. Pat. No. 7,672,862 to Venkatasubramanyan et al. entitled: "Generating a Supply Chain", which is incorporated in its entirety for all purposes as if fully set forth herein. In one aspect the method is used for solving the problem of allocating data paths such as in circuit design, as described in U.S. Pat. No. 7,689,940 to Wei Lee New et al. entitled: "Method and Apparatus for Allocating Data Paths", which is incorporated in its entirety for all purposes as if fully set forth herein. In one aspect the method is used for solving the problem of allocating resources among a plurality of resource utilizers, as described in U.S. Pat. No. 4,744,026 to Vanderbei entitled: "Method and Apparatus for Efficient Resource Allocation", which is incorporated in its entirety for all purposes as if fully set forth herein. In addition to the deterministic problem exampled above, in one aspect the method is used for solving a stochastic linear programming problem (SLP). SLP is described in a tutorial by S. Sen and J. L. Higle, The University of Arizona, "An Introductory Tutorial on Stochastic Linear Programming Models", INTERFACES 29: 2 March-April 1999, pp. 33-61, and in U.S. Patent Application 2009/0271230 to Huang et al. entitled: "Method and System for Solving Stochastic Linear Programs with Conditional Value At Risk Constraints", both are incorporated in their entirety for all purposes as if fully set forth herein.

As used herein, the terms "network" and "digital data" refer generally to any type of telecommunications or data network including, without limitation, data networks (including MANs, WANs, LANs, WLANs, internets, and intranets), hybrid fiber coax (HFC) networks, satellite networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

For performing the tasks in accordance with the computer executable instructions, the general purpose computing devices preferably include one or more of a video adapter, a processing unit, a system memory, and a system bus that couples the video adapter and the system memory to the processing unit. The video adapter allows the computing devices to support a display, such as a Cathode Ray Tube ("CRT"), a Liquid Crystal Display ("LCD"), a flat screen monitor, a touch screen monitor or similar means for displaying text and graphical data to a user. The display allows a user to view, enter, and/or edit information that is relevant to the operation of the system.

The system memory in the general purpose computing devices may include read only memory ("ROM") and/or random access memory ("RAM"). The general purpose computing devices may also include a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their corresponding computer-readable media provide non-volatile storage of computer readable instructions, data structures, program modules and other data for the general purpose computing devices.

To allow communications between the general purpose computing devices, the general purpose computing devices preferably include a network interface or adapter. While the preferred embodiment contemplates that communications will be exchanged primarily via a broadband network, other means of exchanging communications are also contemplated. For example, a wireless access interface that receives and processes information exchanged via a wireless communications medium, such as, cellular communication technology, satellite communication technology, Bluetooth technology, WAP (Wireless Access Point) technology, or similar means of wireless communication can be utilized by the general purpose computing devices.

To provide network security, the general purpose computing devices may also utilize security techniques that have become customary when conducting electronic business. These security techniques include, but are not limited to, firewalls, encryption, authentication certificates, directory-based user registration and security management, etc. Because the capabilities and best practices of network security are constantly evolving and improving, this document does not espouse the use of any particular technique, technology or product. Rather, it simply specifies that the network architecture should support the use of security practices necessary to protect the business interests of the participants and to insure the overall integrity and confidentiality of information within the system.

As used herein, the term "integrated circuit" shall include any type of integrated device of any function, whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

For exchanging information between the partners within the network any networking protocol can be utilized. For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. An example of a message queuing system is IBM's MQ-Series or the Microsoft message queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be corresponding to the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device. Such devices manipulate and transform data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), Erasable Programmable ROMs (EPROMs), Electrically Erasable Programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.).

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.,), or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied therein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block of the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will be appreciated that the aforementioned features and advantages are presented solely by way of example. Accordingly, the foregoing should not be construed or interpreted to constitute, in any way, an exhaustive enumeration of features and advantages of embodiments of the present invention. In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or less steps than those discussed herein.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes that come within the meaning and range of equivalency of the claims are to be embraced within their scope. The corresponding structures, materials, acts, and equivalents of all elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as is suited to the particular use contemplated.

What is claimed is:

1. An apparatus configured to analyze a set of M inequalities constraints relating to N variables wherein M>N>2, the apparatus comprising a memory; and a processor configured by the memory to perform a method comprising the steps of:
   (a) selecting a sub-set of R constraints wherein R>N;
   (b) calculating an Initial Feasible Region (IFR) defined by one or more endpoints and N constraints associated with each endpoints, wherein the endpoints are the intersections of the N constraints out of the selected sub-set, treated as equalities;
   (c) selecting any first constraint out of the M constraints which is not part of the selected sub-set; and
   (d) calculating a Temporary Feasible Region (TFR) by manipulating the IFR versus the first constraint.

2. The apparatus according to claim 1 wherein configured to analyze the entire set of said M inequalities constraints, the method further comprising the steps of:
   (e) selecting a constraint which was not yet selected; and
   (f) updating the temporary feasible region (TFR) by manipulating the temporary feasible region (TFR) versus the selected constraint;
   wherein steps (e) and (f) are repeated until all the constraints are selected, and wherein the last TFR is declared as the feasible region for the set of M inequalities constraints.

3. The apparatus according to claim 2 further configured to check feasibility of the set of M inequalities constraints, the method further comprising a step after step (f) of checking the feasibility of the TFR, and wherein if a feasible TFR is not obtained, declaring the set as non-feasible.

4. The apparatus according to claim 1 further configured to check the feasibility of the set of M inequalities constraints, the method further comprising after said step (b) a step of checking the feasibility of the IFR, and wherein if a feasible IFR is not obtained, declaring the set as non-feasible.

5. The apparatus according to claim 1 further configured to check feasibility of the set of M inequalities constraints, the method further comprising a step after step (d) of checking the feasibility of the TFR, and wherein if a feasible TFR is not obtained, declaring the set as non-feasible.

6. The apparatus according to claim 1 further configured to check activity of constraints in the set of M inequalities constraints, the method further comprising a step after steps (c) or (e) of checking the TFR, and declaring any selected constraint that is not part of the TFR as non-active.

7. The apparatus according to claim 6, wherein the TFR is checked to be an open or a closed region.

8. The apparatus according to claim 7 wherein the TFR is a closed region, and a selected constraint is declared as non-active if all the endpoints defining the TFR satisfy the selected constraint.

9. The apparatus according to claim 1 for scheduling a switching system, the apparatus further comprising a switch having a plurality of P input ports for receiving incoming digital data streams and a plurality of Q output ports for outputting outgoing digital data streams, and wherein the switch is configurable to be in multiple states, wherein in each state each of the input ports is connected to a single output port and each of the output ports is connected to a single input port for transferring the incoming streams into outgoing streams, and wherein said method is used for scheduling as to determine the states order and the length of stay in each state.

10. The apparatus according to claim 9 configured to be used in digital data networking application, wherein the switch is used for routing digital data streams.

11. The apparatus according to claim 10, wherein the switch is operative to receive and route a plurality of digital data streams, and wherein each digital data stream is carrying information using TDM (Time Division Multiplexing) scheme.

12. The apparatus according to claim 11, wherein the digital data streams include packets, cells or frames, and wherein the switching is respectively packet, cell or frame based.

13. The apparatus according to claim 9, wherein the apparatus is part of LAN (Local Area Network), WAN (Wide Area Network), MAN (Metropolitan Area Network) or the Internet.

14. The apparatus according to claim 9, wherein said digital data streams are carried over a conductive medium, and wherein said input and output ports include connectors.

15. The apparatus according to claim 9, wherein said digital data streams are carried over a non-conductive medium, and wherein said input and output ports include antennas or fiber-optics connectors.

16. The apparatus according to claim 9, wherein said switch is at least one of an OSI layer 2 and OSI layer 3 switch.

17. The apparatus according to claim 16, wherein the routing is based on at least one out of IP (Internet Protocol), TCP/IP protocol, Border Gateway Protocol (BGP), and Multi-Protocol Label Switching (MPLS).

18. The apparatus according to claim 9, wherein P=Q.

19. The apparatus according to claim 9, wherein P≠Q.

20. A switching system based on a scheduling method, for use with a set of M inequalities constraints relating to N variables wherein M>N>2, comprising:
   a memory for storing the scheduling method;
   a processor configured by the memory to perform the scheduling method; and
   a switch having a plurality of P input ports for receiving incoming streams and a plurality of Q output ports for outputting outgoing streams, the switch is configurable to be in multiple states, wherein in each state each of the input ports is connected to a single output port and each of the output ports is connected to a single input port for transferring the incoming streams into outgoing streams;

wherein said switch is coupled to said processor for using said scheduling method as to determine the states' order and the length of stay in each state, and wherein said scheduling method comprising the steps of:

(a) selecting a sub-set of L constraints wherein L>N;
(b) calculating an initial feasible region (IFR) defined by one or more endpoints and the N constraints corresponding to each endpoints, wherein the endpoints are the intersections of N constraints out of said selected sub-set, treated as equalities;
(c) selecting a first constraint out of the M constraints which is not part of the selected sub-set; and
(d) calculating a temporary feasible region (TFR) by manipulating the initial feasible region versus the first constraint.

21. The system according to claim 20, wherein said scheduling method is based on solving a standard linear programming.

22. The system according to claim 21 configured to be used in digital data networking application, wherein the switch is used for routing digital data streams.

23. The system according to claim 22, wherein the switch is operative to receive and route a plurality of digital data streams, and wherein each digital data stream is carrying information using TDM (Time Division Multiplexing) scheme.

24. The system according to claim 23, wherein the digital data streams include packets, cells or frames, and wherein the switching is respectively packet, cell or frame based.

25. The system according to claim 23, wherein the switch is part of LAN (Local Area Network), WAN (Wide Area Network), MAN (Metropolitan Area Network) or the Internet.

26. The system according to claim 25, wherein said digital data streams are carried over a conductive medium, and wherein said input and output ports include connectors.

27. The system according to claim 25, wherein said digital data streams are carried over a non-conductive medium, and wherein said input and output ports include antennas or fiber-optics connectors.

28. The system according to claim 25, wherein said switch is at least one of an OSI layer 2 and OSI layer 3 switch.

29. The system according to claim 28, wherein the routing is based on at least one out of IP (Internet Protocol), TCP/IP protocol, Border Gateway Protocol (BGP), and Multi-Protocol Label Switching (MPLS).

30. The system according to claim 20 configured to analyze the whole set of the M inequalities constraints, the method further comprising the steps of:

(e) selecting a constraint which was not yet selected; and
(f) updating the temporary feasible region (TFR) by manipulating the temporary feasible region (TFR) versus the selected constraint;

wherein steps (e) and (f) are repeated until all the constraints are selected, and wherein the last TFR is declared as the feasible region for the set of M inequalities constraints.

31. The system according to claim 20 further configured to check activity of constraints in the set of M inequalities constraints, the method further comprising a step after steps (c) or (e) of checking the TFR, and declaring any selected constraint that is not part of the TFR as non-active.

32. The system according to claim 31, wherein the TFR is checked to be an open or a closed region.

33. The system according to claim 32 wherein the TFR is a closed region, and a selected constraint is declared as non-active if all the endpoints defining the TFR satisfy the selected constraint.

34. The system according to claim 20, wherein P=Q.

35. The system according to claim 20, wherein P≠Q.

* * * * *